United States Patent
Shandilya et al.

(10) Patent No.: US 11,600,039 B2
(45) Date of Patent: Mar. 7, 2023

(54) MECHANISM FOR IMPROVED LIGHT ESTIMATION

(71) Applicant: QUALCOMM Incorporated, San Diego, CA (US)

(72) Inventors: Aarrushi Shandilya, Delhi (IN); Vinay Melkote Krishnaprasad, Bangalore (IN); Pawan Kumar Baheti, Bangalore (IN); Naveen Srinivasamurthy, Bangalore (IN); Sandeep Kanakapura Lakshmikantha, Bangalore (IN); Sagar Ravindra Kalbande, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/121,683

(22) Filed: Dec. 14, 2020

(65) Prior Publication Data

US 2022/0189108 A1 Jun. 16, 2022

(51) Int. Cl.
*G06T 7/70* (2017.01)
*G06V 10/60* (2022.01)
*G06T 15/50* (2011.01)
*G06K 9/62* (2022.01)

(52) U.S. Cl.
CPC .......... *G06T 15/506* (2013.01); *G06K 9/6217* (2013.01); *G06T 7/70* (2017.01); *G06V 10/60* (2022.01); *G06T 2207/20084* (2013.01)

(58) Field of Classification Search
CPC ....... G06T 15/506; G06T 7/70; G06K 9/4661; G06K 9/6217
USPC ......................................................... 345/426
See application file for complete search history.

(56) References Cited

U.S. PATENT DOCUMENTS

| | | | |
|---|---|---|---|
| 10,664,962 B1* | 5/2020 | Adam | G06T 15/506 |
| 2010/0284612 A1* | 11/2010 | Peters | G06T 7/90 |
| | | | 382/165 |
| 2012/0301860 A1* | 11/2012 | Yamashita | G06K 9/00228 |
| | | | 434/350 |
| 2016/0364866 A1* | 12/2016 | Sampigethaya | G01S 5/0027 |
| 2019/0026586 A1* | 1/2019 | Liu | G06K 9/627 |
| 2021/0065440 A1* | 3/2021 | Sunkavalli | G06T 7/70 |
| 2021/0166437 A1* | 6/2021 | LeGendre | G06T 3/60 |

* cited by examiner

*Primary Examiner* — Hai Tao Sun
(74) *Attorney, Agent, or Firm* — Polsinelli LLP

(57) ABSTRACT

Techniques and systems are provided for light estimation. In some examples, a system receives a plurality of frames associated with a scene. The plurality of frames includes a first frame and a second frame occurring after the first frame. The system determines, based on image data of the first frame, a first light estimate associated with the scene. The system also determines, based on image data of the second frame, a second light estimate associated with the scene. The system further generates an aggregate light estimate associated with the scene based on combining the second light estimate with at least the first light estimate.

30 Claims, 12 Drawing Sheets

800

Receive A Plurality Of Frames Associated With A Scene, The Plurality Of Frames Including A First Frame And A Second Frame Occurring After The First Frame
802

Determine, Based On Image Data Of The First Frame, A First Light Estimate Associated With The Scene
804

Determine, Based On Image Data Of The Second Frame, A Second Light Estimate Associated With The Scene
806

Generate An Aggregate Light Estimate Associated With The Scene Based On Combining The Second Light Estimate With At Least The First Light Estimate
808

FIG. 8

MECHANISM FOR IMPROVED LIGHT ESTIMATION

FIELD

The present disclosure generally relates to techniques and systems for light estimation in extended reality environments and other environments. More specifically, the present disclosure relates to techniques and systems for temporally and spatially consistent light estimation.

BACKGROUND

Image sensors are commonly integrated into a wide array of electronic devices such as cameras, mobile phones, autonomous systems (e.g., autonomous drones, cars, robots, etc.), smart wearables, extended reality (e.g., augmented reality, virtual reality, mixed reality) devices, and many other devices. The image sensors allow users to light signals and images from any electronic device equipped with an image sensor. The light signals and images can be captured for recreational use, professional photography, surveillance, and automation, among other applications.

In some cases, the light signals and image data captured by an image sensor can be analyzed to identify certain characteristics about the image data and/or the scene captured by the image data, which can then be used to modify the captured image data or perform various tasks. For example, light signals and/or image data can be analyzed to perform light estimation of a scene. Light estimation may include determining information about one or more light sources illuminating the scene, such as the number, type, and/or location of the light sources, as well as the intensity, color temperature, and/or other ambient qualities of the light emitted by the light sources. In some cases, light estimation can be implemented within extended reality systems to facilitate immersive blending of virtual content with real-world content visible through an extended reality display (e.g., a head-mounted display). Light estimation can be useful in various other applications, such as applications that involve performing image processing operations or algorithms (e.g., auto-white balance algorithms).

SUMMARY

Systems and techniques are described herein that can be implemented to perform light estimation. According to at least one example, apparatuses are provided for light estimation. An example apparatus can include a memory (or multiple memories) and a processor or multiple processors (e.g., implemented in circuitry) coupled to the memory (or memories). The processor (or processors) is configured to: receive a plurality of frames associated with a scene, the plurality of frames including a first frame and a second frame occurring after the first frame; determine, based on image data of the first frame, a first light estimate associated with the scene; determine, based on image data of the second frame, a second light estimate associated with the scene; and generate an aggregate light estimate associated with the scene based on combining the second light estimate with at least the first light estimate.

In another example, an apparatus is provided that includes: receiving a plurality of frames associated with a scene, the plurality of frames including a first frame and a second frame occurring after the first frame; determining, based on image data of the first frame, a first light estimate associated with the scene; determining, based on image data of the second frame, a second light estimate associated with the scene; and generating an aggregate light estimate associated with the scene based on combining the second light estimate with at least the first light estimate.

In another example, methods for light estimation are provided. An example method can include receiving a plurality of frames associated with a scene, the plurality of frames including a first frame and a second frame occurring after the first frame. The method can also include determining, based on image data of the first frame, a first light estimate associated with the scene. The method can further include determining, based on image data of the second frame, a second light estimate associated with the scene. The method can then include generating an aggregate light estimate associated with the scene based on combining the second light estimate with at least the first light estimate.

In another example, non-transitory computer-readable media are provided for light estimation. An example non-transitory computer-readable medium can store instructions that, when executed by one or more processors, cause the one or more processors to: receive a plurality of frames associated with a scene, the plurality of frames including a first frame and a second frame occurring after the first frame; determine, based on image data of the first frame, a first light estimate associated with the scene; determine, based on image data of the second frame, a second light estimate associated with the scene; and generate an aggregate light estimate associated with the scene based on combining the second light estimate with at least the first light estimate.

In some aspects, the method, apparatuses, and computer-readable medium described above can include detecting a change in at least one light source illuminating the scene based at least in part on comparing the second light estimate and the aggregate light estimate.

In some aspects, the method, apparatuses, and computer-readable medium described above can include: determining a third light estimate associated with the scene based on image data of a third frame of the plurality of frames occurring after the second frame; and generating an updated aggregate light estimate based on combining the third light estimate with the aggregate light estimate.

In some aspects, generating the aggregate light estimate can include combining one or more first estimated feature vectors associated with the first light estimate and one or more second estimated feature vectors associated with the second light estimate. In some examples, the method, apparatus, and computer-readable medium described above can include assigning a first weight to the one or more first estimated feature vectors and assigning a second weight to the one or more second estimated feature vectors, the second weight being higher than the first weight. In other examples, the method, apparatus, and computer-readable medium described above can include assigning a first weight to the one or more first estimated feature vectors and assigning a second weight to the one or more second estimated feature vectors, the second weight being lower than the first weight. In some aspects, the method, apparatus, and computer-readable medium described above can include determining the one or more first estimated feature vectors and the one or more second estimated feature vectors using a neural network having an encoder-decoder architecture. In some examples, combining the one or more first estimated feature vectors and the one or more second estimated feature vectors can include using a clustering algorithm. In other examples, combining the one or more first estimated feature vectors and the one or more second estimated feature vectors can include using a neural network. In some aspects, the method, apparatus, and computer-readable medium described above can include: inputting, to the neural network, a first pose of the apparatus (or another device that captures the plurality of frames) associated with the first frame and a second pose of the apparatus (or the other device) associated with the second frame; and generating, using the neural network, the aggregate light estimate based on the first pose and the second pose of the apparatus (or the other device). In some examples, the neural network can include a long short-term memory (LSTM) unit.

In some aspects, the method, apparatuses, and computer-readable medium described above can include generating a three-dimensional reconstruction of the scene, the three-dimensional reconstruction of the scene indicating one or more obstructions that prevent light from being transmitted from a light source illuminating the scene to an image sensor of the apparatus. In some examples, the method, apparatus, and computer-readable medium described above can include: determining a light source indicated by the second light estimate is invalid based at least in part on the one or more obstructions indicated by the three-dimensional reconstruction of the scene; and based on the determination that the light source indicated by the second light estimate is invalid, excluding the light source indicated by the second light estimate from the aggregate light estimate.

In some aspects, the method, apparatuses, and computer-readable medium described above can include: storing the aggregate light estimate in association with a location of the scene; and retrieving the aggregate light estimate based on determining the apparatus is located at the location of the scene.

In some aspects, the method, apparatuses, and computer-readable medium described above can include: determining an amount of sunlight illuminating the scene based at least in part on a current time of day or a current time of year; and adjusting the aggregate light estimate based at least in part on the amount of sunlight. In some examples, the method, apparatus, and computer-readable medium described above can include: determining a portion of the second light estimate is invalid based on the amount of sunlight; and based on the determination that the portion of the second light estimate is invalid, excluding the portion of the light estimation information from the aggregate light estimate.

In some aspects, the method, apparatuses, and computer-readable medium described above can include determining a location of a light source illuminating the scene based on determining one or more pixels of the plurality of frames correspond to the light source.

In some aspects, the method, apparatuses, and computer-readable medium described above can include rendering virtual content using a display based at least in part on the aggregate light estimate.

In some aspects, the method, apparatuses, and computer-readable medium described above can include performing one or more image processing operations on the image data of the second frame based at least in part on the aggregate light estimate.

In some aspects, each apparatus described above is or includes a camera, a mobile device (e.g., a mobile telephone or so-called "smart phone" or other mobile device), a smart wearable device, an extended reality device (e.g., a virtual reality (VR) device, an augmented reality (AR) device, or a mixed reality (MR) device), a personal computer, a laptop computer, a server computer, an autonomous vehicle, or other device. In some aspects, the apparatus includes a camera or multiple cameras for capturing one or more videos and/or images. In some aspects, the apparatus further includes a display for displaying one or more videos and/or images. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures:

FIG. 8 is flow diagram illustrating an example of a process for light estimation, in accordance with some examples;

DETAILED DESCRIPTION

Figure 1:
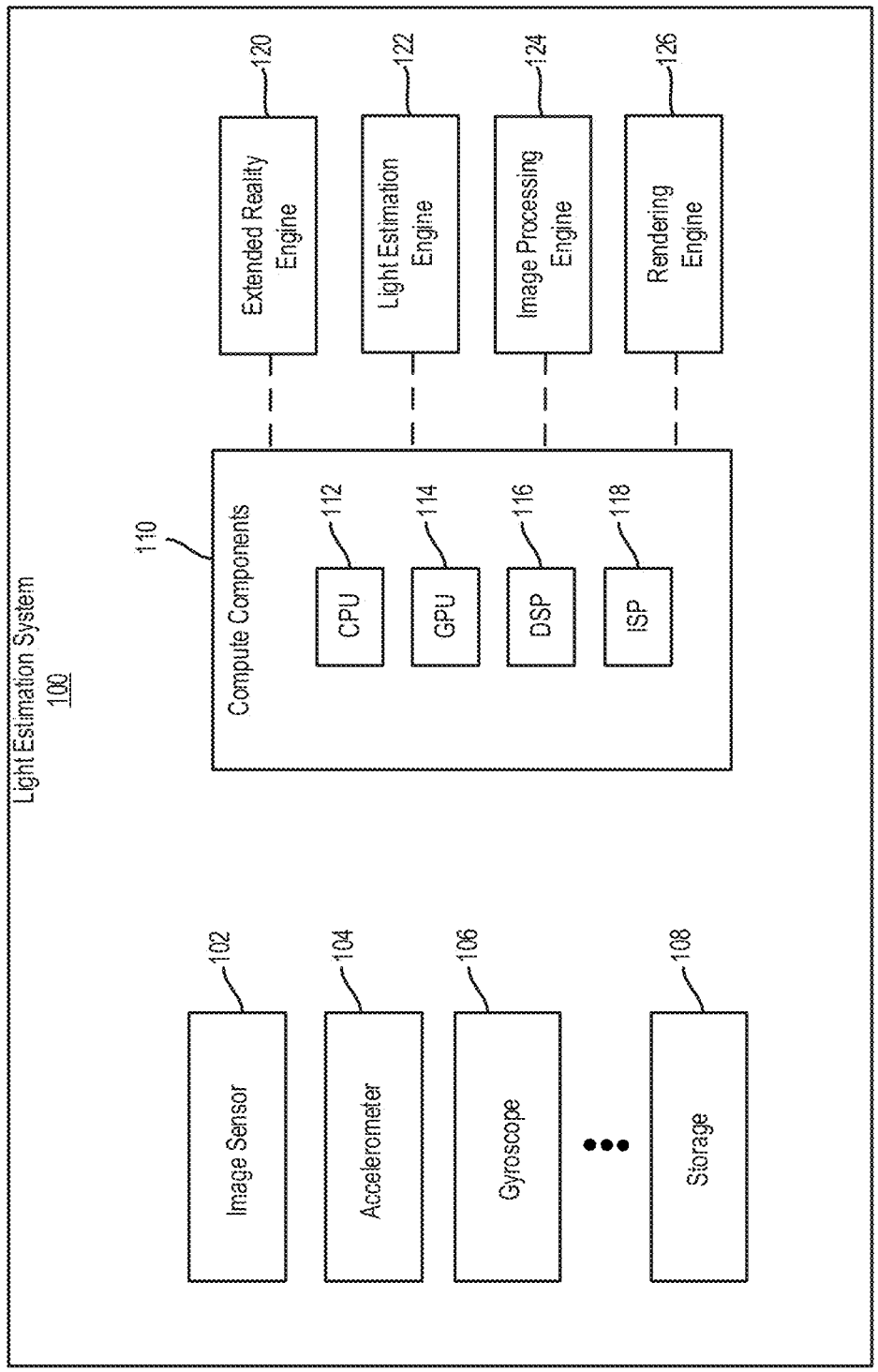
FIG. 1 is a block diagram illustrating an example architecture of a light estimation system in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

As noted above, light estimation can include determining lighting parameters of one or more light sources illuminating a scene. For instance, light estimation can include determining the number, type, and/or location of the light sources. Further, light estimation can include determining the intensity, color temperature, and/or other ambient qualities of the light emitted by the light sources. In some cases, light estimation can be implemented within extended reality systems to facilitate immersive blending of virtual content with real-world content visible through an extended reality display (e.g., a head-mounted display). Light estimation can be useful in various other applications, such as applications that involve performing image processing operations or algorithms (e.g., auto-white balance algorithms, auto-exposure algorithms, auto-focus algorithms, among others).

The present disclosure describes systems, apparatuses, methods, and computer-readable media (collectively referred to as "systems and techniques") for improved light estimation. The systems and techniques can provide the ability of a light estimation system to generate temporally consistent light estimations. Such light estimations can also be referred to as light maps. For example, the light estimation system can determine an aggregate light estimation that represents the average lighting characteristics (e.g., lighting parameters) of one or more light sources over a period of time. In one example, the light estimation system can determine multiple individual values for lighting parameters corresponding to multiple frames received at different points in time. The light estimation system can average or otherwise combine the individual values, which may result in higher quality light estimation. For instance, the combined value (e.g., the average value) may be relatively static over time. Because the combined value is static over time, content can be displayed according to the lighting characteristics. In one illustrative example, the combined value can enable an extended reality (XR) system (e.g., an augmented reality (AR) device, a virtual reality (VR) device, a mixed reality (MR) device, etc.) to smoothly adjust virtual content overlaid on real-world content such that the virtual content is cohesive with lighting characteristics of the real-world environment. In some cases, the light estimation system can quickly and accurately detect changes in one or more light sources. For example, based on a comparison between lighting parameters associated with a current frame and averaged lighting parameters associated with previous frames, the light estimation system can detect that a light source has been turned on or turned off, has been dimmed or brightened, a device has entered or exited a lighted room, or has otherwise change. The light estimation system can update the aggregate light estimation based on the detected change in light source(s).

In some cases, the light estimation system can utilize a machine learning system and/or algorithm (e.g., a convolutional neural network (CNN)) to perform individual light estimation for a current frame. The machine learning system and/or algorithm can output feature vectors corresponding to one or more lighting parameters. The light estimation system can then update an aggregate light estimation (e.g., a light map corresponding to multiple previous frames) based on the individual light estimation. In one example, the light estimation system can update the aggregate light estimation by clustering feature vectors determined by the machine learning system and/or algorithm. In another example, the light estimation system can update the aggregate light estimation using a neural network trained to distinguish short-term lighting parameters from long-term lighting parameters. For instance, the neural network can include a long short-term memory (LSTM) network that can be trained to detect changes in light sources. In some cases, the LSTM can be trained to determine the relevance of long-term or short-term changes in the lighting of a scene based at least in part on changes in the pose of a device or system (e.g., an XR system, a mobile device, etc.) used to capture images of the scene.

Further, the light estimation system can generate spatially consistent light maps. For example, the light estimation system can use the geometry of a scene (e.g., a three-dimensional (3D) reconstruction of the scene) to filter noisy and/or inaccurate light estimates. In one example, the light estimation system can generate a 3D reconstruction of a scene concurrently with determining individual light estimates. Based on the 3D reconstruction, the light estimation system can detect one or more obstructions within the scene. The obstructions can include any person, pet, piece of furniture, wall, or other physical object that may block light transmitted by a light source. The light estimation system can compare the 3D location of any determined obstructions with the 3D location of a light source indicated by an individual light estimate of a current frame. If the light estimation system determines that an obstructions exists between the light source and a camera sensor that captured the current frame, the light estimation system can disregard the light source as noise.

Further details regarding light estimation systems are provided herein with respect to various figures. FIG. 1 is a diagram illustrating an example light estimation system 100, in accordance with some aspects of the disclosure. The light estimation system 100 can be part of, or implemented by, a single computing device or multiple computing devices. In some cases, the light estimation system 100 can be part of, or implemented by, an XR system or device. For instance, the light estimation system 100 can run (or execute) XR applications and implement XR operations. The XR system or device that includes and/or implements the light estimation system 100 can be an XR head-mounted display (HMD) device (e.g., a virtual reality (VR) headset, an augmented reality (AR) headset, or an mixed reality (MR) headset), XR glasses (e.g., AR glasses), among other XR systems or devices. In some examples, the light estimation system 100 can be part of, or implemented by, any other device or system, such as a camera system (e.g., a digital camera, an IP camera, a video camera, a security camera, etc.), a telephone system (e.g., a smartphone, a cellular telephone, a conferencing system, etc.), a desktop computer, a laptop or notebook computer, a tablet computer, a set-top box, a network-connected television (or so-called "smart" television), a display device, a gaming console, a video streaming device, an Internet-of-Things (IoT) device, a vehicle (or computing device of a vehicle), and/or any other suitable electronic device(s).

In some examples, the light estimation system 100 can perform tracking and localization, mapping of the physical world (e.g., a scene), and positioning and rendering of virtual content on a display (e.g., a screen, visible plane/region, and/or other display) as part of an XR experience. For example, the light estimation system 100 can generate a map (e.g., 3D map) of a scene in the physical world, track a pose (e.g., location and position) of the light estimation system 100 relative to the scene (e.g., relative to the 3D map of the scene), position and/or anchor virtual content in a specific location(s) on the map of the scene, and render the virtual content on the display. The light estimation system 100 can render the virtual content on the display such that the virtual content appears to be at a location in the scene corresponding to the specific location on the map of the scene where the virtual content is positioned and/or anchored. In some examples, the display can include a glass, a screen, a lens, and/or other display mechanism that allows a user to see the real-world environment and also allows XR content to be displayed thereon.

As shown in FIG. 1, the light estimation system 100 can include one or more image sensors 102, an accelerometer 104, a gyroscope 106, storage 108, compute components 110, an XR engine 120, a light estimation engine 122, an image processing engine 124, and a rendering engine 126. It should be noted that the components 102-126 shown in FIG. 1 are non-limiting examples provided for illustrative and explanation purposes, and other examples can include more, less, or different components than those shown in FIG. 1. For example, in some cases, the light estimation system 100 can include one or more other sensors (e.g., one or more inertial measurement units (IMUs), radars, light detection and ranging (LIDAR) sensors, audio sensors, etc.), one or more display devices, one more other processing engines, one or more other hardware components, and/or one or more other software and/or hardware components that are not shown in FIG. 1. An example architecture and example hardware components that can be implemented by the light estimation system 100 are further described below with respect to FIG. 11.

For simplicity and explanation purposes, the one or more image sensors 102 will be referenced herein as an image sensor 102 (e.g., in singular form). However, one of ordinary skill in the art will recognize that the light estimation system 100 can include a single image sensor or multiple image sensors. Also, references to any of the components (e.g., 102-126) of the light estimation system 100 in the singular or plural form should not be interpreted as limiting the number of such components implemented by the light estimation system 100 to one or more than one. For example, references to an accelerometer 104 in the singular form should not be interpreted as limiting the number of accelerometers implemented by the light estimation system 100 to one. One of ordinary skill in the art will recognize that, for any of the components 102-126 shown in FIG. 1, the light estimation system 100 can include only one of such component(s) or more than one of such component(s).

The light estimation system 100 can include or be in communication with (wired or wirelessly) an input device. The input device can include any suitable input device, such as a touchscreen, a pen or other pointer device, a keyboard, a mouse a button or key, a microphone for receiving voice commands, a gesture input device for receiving gesture commands, any combination thereof, and/or other input device. In some cases, the image sensor 102 can capture images that can be processed for interpreting gesture commands.

The light estimation system 100 can be part of, or implemented by, a single computing device or multiple computing devices. In some examples, the light estimation system 100 can be part of an electronic device (or devices) such as an extended reality head-mounted display (HMD) device, extended reality glasses (e.g., augmented reality or AR glasses), a camera system (e.g., a digital camera, an IP camera, a video camera, a security camera, etc.), a telephone system (e.g., a smartphone, a cellular telephone, a conferencing system, etc.), a desktop computer, a laptop or notebook computer, a tablet computer, a set-top box, a smart television, a display device, a gaming console, a video streaming device, an Internet-of-Things (IoT) device, and/or any other suitable electronic device(s).

In some implementations, the one or more image sensors 102, the accelerometer 104, the gyroscope 106, storage 108, compute components 110, the XR engine 120, the light estimation engine 122, the image processing engine 124, and the rendering engine 126 can be part of the same computing device. For example, in some cases, the one or more image sensors 102, the accelerometer 104, the gyroscope 106, storage 108, compute components 110, the XR engine 120, the light estimation engine 122, image processing engine 124, and rendering engine 126 can be integrated into an HMD, extended reality glasses, smartphone, laptop, tablet computer, gaming system, and/or any other computing device. However, in some implementations, the one or more image sensors 102, the accelerometer 104, the gyroscope 106, storage 108, compute components 110, the XR engine 120, the light estimation engine 122, the image processing engine 124, and the rendering engine 126 can be part of two or more separate computing devices. For example, in some cases, some of the components 102-126 can be part of, or implemented by, one computing device and the remaining components can be part of, or implemented by, one or more other computing devices.

The storage 108 can be any storage device(s) for storing data. Moreover, the storage 108 can store data from any of the components of the light estimation system 100. For example, the storage 108 can store data from the image sensor 102 (e.g., image or video data), data from the accelerometer 104 (e.g., measurements), data from the gyroscope 106 (e.g., measurements), data from the compute components 110 (e.g., processing parameters, preferences, virtual content, rendering content, scene maps, tracking and localization data, object detection data, privacy data, XR application data, face recognition data, occlusion data, etc.), data from the XR engine 120, data from the a light estimation engine 122, data from the image processing engine 124, and/or data from the rendering engine 126 (e.g., output frames). In some examples, the storage 108 can include a buffer for storing frames for processing by the compute components 110.

The one or more compute components 110 can include a central processing unit (CPU) 112, a graphics processing unit (GPU) 114, a digital signal processor (DSP) 116, and/or an image signal processor (ISP) 118. The compute components 110 can perform various operations such as image enhancement, computer vision, graphics rendering, extended reality (e.g., tracking, localization, pose estimation, mapping, content anchoring, content rendering, etc.), image/video processing, sensor processing, recognition (e.g., text recognition, facial recognition, object recognition, feature recognition, tracking or pattern recognition, scene recognition, occlusion detection, etc.), machine learning, filtering, and any of the various operations described herein. In this example, the compute components 110 implement the XR engine 120, the light estimation engine 122, the image processing engine 124, and the rendering engine 126. In other examples, the compute components 110 can also implement one or more other processing engines.

The image sensor 102 can include any image and/or video sensors or capturing devices. In some examples, the image sensor 102 can be part of a multiple-camera assembly, such as a dual-camera assembly. The image sensor 102 can capture image and/or video content (e.g., raw image and/or video data), which can then be processed by the compute components 110, the XR engine 120, the light estimation engine 122, the image processing engine 124, and/or the rendering engine 126 as described herein.

In some examples, the image sensor 102 can capture image data and can generate frames based on the image data and/or can provide the image data or frames to the XR engine 120, the light estimation engine 122, the image processing engine 124, and/or the rendering engine 126 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

In some cases, the image sensor 102 (and/or other image sensor or camera of the light estimation system 100) can be configured to also capture depth information. For example, in some implementations, the image sensor 102 (and/or other camera) can include an RGB-depth (RGB-D) camera. In some cases, the light estimation system 100 can include one or more depth sensors (not shown) that are separate from the image sensor 102 (and/or other camera) and that can capture depth information. For instance, such a depth sensor can obtain depth information independently from the image sensor 102. In some examples, a depth sensor can be physically installed in a same general location the image sensor 102, but may operate at a different frequency or frame rate from the image sensor 102. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

As noted above, in some cases, the light estimation system 100 can also include one or more sensors (not shown) other than the image sensor 102. For instance, the one or more sensors can include one or more accelerometers (e.g., accelerometer 104), one or more gyroscopes (e.g., gyroscope 106), and/or other sensors. The one or more sensors can provide velocity, orientation, and/or other position-related information to the compute components 110. For example, the accelerometer 104 can detect acceleration by the light estimation system 100 and can generate acceleration measurements based on the detected acceleration. In some cases, the accelerometer 104 can provide one or more translational vectors (e.g., up/down, left/right, forward/back) that can be used for determining a position or pose of the light estimation system 100. The gyroscope 106 can detect and measure the orientation and angular velocity of the light estimation system 100. For example, the gyroscope 106 can be used to measure the pitch, roll, and yaw of the light estimation system 100. In some cases, the gyroscope 106 can provide one or more rotational vectors (e.g., pitch, yaw, roll). In some examples, the image sensor 102 and/or the XR engine 120 can use measurements obtained by the accelerometer 104 (e.g., one or more translational vectors) and/or the gyroscope 106 (e.g., one or more rotational vectors) to calculate the pose of the light estimation system 100. As previously noted, in other examples, the light estimation system 100 can also include other sensors, such as an inertial measurement unit (IMU), a magnetometer, a machine vision sensor, a smart scene sensor, a speech recognition sensor, an impact sensor, a shock sensor, a position sensor, a tilt sensor, etc.

In some cases, the one or more sensors can include at least one IMU. An IMU is an electronic device that measures the specific force, angular rate, and/or the orientation of the light estimation system 100, using a combination of one or more accelerometers, one or more gyroscopes, and/or one or more magnetometers. In some examples, the one or more sensors can output measured information associated with the capture of an image captured by the image sensor 102 (and/or other camera of the light estimation system 100) and/or depth information obtained using one or more depth sensors of the light estimation system 100.

The output of one or more sensors (e.g., the accelerometer 104, the gyroscope 106, one or more IMUs, and/or other sensors) can be used by the extended reality engine 120 to determine a pose of the light estimation system 100 (also referred to as the head pose) and/or the pose of the image sensor 102 (or other camera of the light estimation system 100). In some cases, the pose of the light estimation system 100 and the pose of the image sensor 102 (or other camera) can be the same. The pose of image sensor 102 refers to the position and orientation of the image sensor 102 relative to a frame of reference. In some implementations, the camera pose can be determined for 6-Degrees Of Freedom (6DOF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference).

In some cases, a device tracker (not shown) can use the measurements from the one or more sensors and image data from the image sensor 102 to track a pose (e.g., a 6DOF pose) of the light estimation system 100. For example, the device tracker can fuse visual data (e.g., using a visual tracking solution) from captured image data with inertial measurement data to determine a position and motion of the light estimation system 100 relative to the physical world (e.g., the scene) and a map of the physical world. As described below, in some examples, when tracking the pose of the light estimation system 100, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the light estimation system 100 within the scene and the 3D map of the scene, etc. The 3D map can provide a digital representation of a scene in the real/physical world. In some examples, the 3D map can anchor location-based objects and/or content to real-world coordinates and/or objects. The light estimation system 100 can use a mapped scene (e.g., a scene in the physical world represented by, and/or associated with, a 3D map) to merge the physical and virtual worlds and/or merge virtual content or objects with the physical environment.

In some aspects, the pose of image sensor 102 and/or the light estimation system 100 as a whole can be determined and/or tracked by the compute components 110 using a visual tracking solution based on images captured by the image sensor 102 (and/or other camera of the light estimation system 100). For instance, in some examples, the compute components 110 can perform tracking using computer vision-based tracking, model-based tracking, and/or simultaneous localization and mapping (SLAM) techniques. For instance, the compute components 110 can perform SLAM or can be in communication (wired or wireless) with a SLAM engine (not shown). SLAM refers to a class of techniques where a map of an environment (e.g., a map of an environment being modeled by light estimation system 100) is created while simultaneously tracking the pose of a camera (e.g., image sensor 102) and/or the light estimation system 100 relative to that map. The map can be referred to as a SLAM map, and can be 3D. The SLAM techniques can be performed using color or grayscale image data captured by the image sensor 102 (and/or other camera of the light estimation system 100), and can be used to generate estimates of 6DOF pose measurements of the image sensor 102 and/or the light estimation system 100. Such a SLAM technique configured to perform 6DOF tracking can be referred to as 6DOF SLAM. In some cases, the output of the one or more sensors (e.g., the accelerometer 104, the gyroscope 106, one or more IMUs, and/or other sensors) can be used to estimate, correct, and/or otherwise adjust the estimated pose.

In some cases, the 6DOF SLAM (e.g., 6DOF tracking) can associate features observed from certain input images from the image sensor 102 (and/or other camera) to the SLAM map. For example, 6DOF SLAM can use feature point associations from an input image to determine the pose (position and orientation) of the image sensor 102 and/or light estimation system 100 for the input image. 6DOF mapping can also be performed to update the SLAM map. In some cases, the SLAM map maintained using the 6DOF SLAM can contain 3D feature points triangulated from two or more images. For example, key frames can be selected from input images or a video stream to represent an observed scene. For every key frame, a respective 6DOF camera pose associated with the image can be determined. The pose of the image sensor 102 and/or the light estimation system 100 can be determined by projecting features from the 3D SLAM map into an image or video frame and updating the camera pose from verified 2D-3D correspondences.

In one illustrative example, the compute components 110 can extract feature points from every input image or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The features points in key frames either match (are the same or correspond to) or fail to match the features points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Speed Up Robust Features (SURF), Gradient Location-Orientation histogram (GLOH), Normalized Cross Correlation (NCC), or other suitable technique.

In some cases, the light estimation system 100 can also track the hand and/or fingers of a user to allow the user to interact with and/or control virtual content in a virtual environment. For example, the light estimation system 100 can track a pose and/or movement of the hand and/or fingertips of the user to identify or translate user interactions with the virtual environment. The user interactions can include, for example and without limitation, moving an item of virtual content, resizing the item of virtual content and/or a location of the virtual private space, selecting an input interface element in a virtual user interface (e.g., a virtual representation of a mobile phone, a virtual keyboard, and/or other virtual interface), providing an input through a virtual user interface, etc.

The operations for the XR engine 120, the light estimation engine 122, the image processing engine 124, and the rendering engine 126 can be implemented by any of the compute components 110. In one illustrative example, the operations of the rendering engine 126 can be implemented by the GPU 114, and the operations of the XR engine 120, the light estimation engine 122, and the image processing engine 124 can be implemented by the CPU 112, the DSP 116, and/or the ISP 118. In some cases, the compute components 110 can include other electronic circuits or hardware, computer software, firmware, or any combination thereof, to perform any of the various operations described herein.

In some examples, the XR engine 120 can perform XR operations to generate an XR experience based on data from the image sensor 102, the accelerometer 104, the gyroscope 106, and/or one or more sensors on the light estimation system 100, such as one or more IMUs, radars, etc. In some examples, the XR engine 120 can perform tracking, localization, pose estimation, mapping, content anchoring operations and/or any other XR operations/functionalities. An XR experience can include use of the light estimation system 100 to present XR content (e.g., virtual reality content, augmented reality content, mixed reality content, etc.) to a user during a virtual session. In some examples, the XR content and experience can be provided by the light estimation system 100 through an XR application (e.g., executed or implemented by the XR engine 120) that provides a specific XR experience such as, for example, an XR gaming experience, an XR classroom experience, an XR shopping experience, an XR entertainment experience, an XR activity (e.g., an operation, a troubleshooting activity, etc.), among others. During the XR experience, the user can view and/or interact with virtual content using the light estimation system 100. In some cases, the user can view and/or interact with the virtual content while also being able to view and/or interact with the physical environment around the user, allowing the user to have an immersive experience between the physical environment and virtual content mixed or integrated with the physical environment.

The light estimation engine 122 can perform various light estimation operations associated with image data captured by the image sensor 102 (or other image sensors of the light estimation system 100). In some cases, light estimation can include determining characteristics of one or more light sources that illuminate a scene. Examples of light sources include, without limitation, overhead lights, lamps, candles, flashlights, displays (e.g., computer monitors, televisions, etc.), reflective surfaces (e.g., mirrors), and windows that transmit sunlight or light from other external sources, among other light sources. In some examples, the characteristics of a light source can be referred to as "lighting parameters" or "lighting cues." The light estimation system 100 can use lighting parameters associated with a scene to facilitate immersive blending of virtual content with real-world content (e.g., real-world content visible to a user through an XR display of the light estimation system 100). For instance, the XR engine 120 can adjust visual characteristics of virtual objects (such as the color, shadows, shading, reflections, and/or specular highlights of the virtual objects) to ensure the virtual objects are visually coherent with respect to light sources illuminating the real-world objects. In some cases, the XR engine 120 can adjust visual characteristics of virtual objects by selecting (and implementing) one or more rendering models based on lighting parameters determined for a scene. When rendered within an XR display using the selected rendering model, the virtual objects may appear to be illuminated by the same light sources as the real-world objects. Further, the light estimation system 100 can utilize light estimation for applications not related to XR systems or similar systems. For instance, the light estimation system 100 can utilize light estimation to improve the quality of various image processing operations. In an illustrative example, the light estimation system 100 can use lighting parameters associated with a scene to implement a spatially varying auto-white balance algorithm (or other "3A" algorithm) within an image frame.

The light estimation engine 122 can determine any number or type of lighting parameters when performing light estimation. In one example, the light estimation engine 122 can determine the number and/or type of light sources illuminating a scene. The light estimation engine 122 can also determine a location of the light sources (e.g., the position, depth, and/or orientation of the light sources). Further, the light estimation engine 122 can determine ambient light qualities of a scene (e.g., fine and/or coarse ambient light qualities). In one example, the light estimation engine 122 can represent fine ambient qualities of a scene using a high-dynamic-range (HDR) map. Further, the light estimation engine 122 can determine the light intensity and/or color temperature of light emitted by one or more light sources. In an illustrative example, light estimation engine 122 can determine (e.g., estimate) a wattage of a lightbulb. In another illustrative example, the light estimation engine 122 can determine that a lightbulb is a fluorescent lightbulb (e.g., instead of an incandescent lightbulb), or determine that the lightbulb is a "soft white" lightbulb (e.g., instead of a "warm white" or "bright white" lightbulb). In a further illustrative example, the light estimation engine 122 can determine that a light source is a spherical light source (e.g., instead of a point light source).

In some cases, the light estimation engine 122 can perform light estimation for individual frames. The light estimation engine 122 can also perform aggregate (e.g., cumulative) light estimation by combining lighting parameters associated with multiple frames. As will be explained in more detail below, performing aggregate light estimation can enable the light estimation system 100 to more accurately and/or efficiently determine lighting parameters of the light sources illuminating a scene (e.g., in comparison to light estimation systems that utilize light estimation associated with only individual frames).

Figures 2A, 2B, 2C:
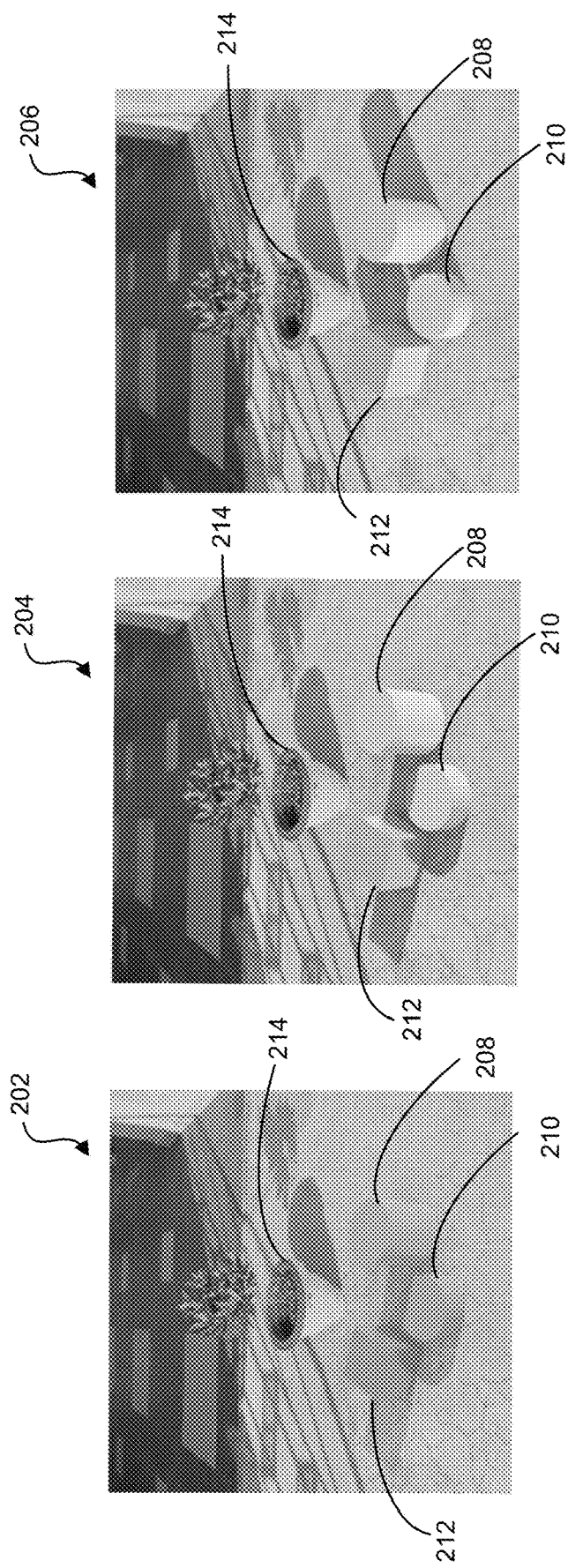
FIG. 2A, FIG. 2B, and FIG. 2C are illustrations of example virtual content generated based on light estimation, in accordance with some examples.

FIG. 2A, FIG. 2B, and FIG. 2C provide illustrations of an example light estimation process that may be performed by the light estimation system 100 (or any other light estimation system described herein). For instance, FIG. 2A shows a frame 202 that includes a physical object 214 (e.g., a potted plant) and virtual objects 208, 210, and 212 (e.g., blocks). The virtual objects 208, 210, and 212 represent examples of virtual content that can be generated and/or rendered by the light estimation system 100. In one example, the state (e.g., appearance) of the virtual objects 208, 210, and 212 in FIG. 2A can correspond to an initial state before the light estimation system 100 adjusts the visual appearance of the virtual objects 208, 210, and 212 based on lighting parameters associated with a scene. For instance, the virtual objects 208, 210, and 212 have been rendered using a standard and/or default rendering model. As shown, the visual appearance of the virtual objects 208, 210, and 212 has a poor correlation with the visual appearance of the physical object 214. For example, the direction and intensity of the shadows of the virtual objects 208, 210, and 212 do not match the direction and intensity of the shadow of the physical object 214. Further, the color casting and shading of the virtual objects 208, 210, and 212 do not correspond to the illumination of the scene (e.g., illumination by a high level of sunlight). FIG. 2B shows a frame 204 that includes the virtual objects 208, 210, and 212 after the light estimation system 100 adjusts the visual appearance of the virtual objects 208, 210, and 212 based on several lighting parameters of the light sources illuminating the scene. For example, the shadow intensity, color casting, and reflections associated with the virtual objects 208, 210, and 212 have been adjusted based on lighting parameters such as the power level and color of ambient light within the scene. As shown, the virtual objects 208, 210, and 212 in frame 204 appear to be more cohesive with respect to the physical object 214 than the virtual objects 208, 210, and 212 in frame 202. FIG. 2C shows a frame 206 representing additional improvements to the visual appearance of the virtual objects 208, 210, and 212. In this example, the visual appearance of the virtual objects 208, 210, and 212 has been adjusted to account for the direction of the main light source illuminating the scene. As shown, this update includes correcting the direction of the shadows of the virtual objects 208, 210, and 212. Overall, the virtual objects 208, 210, and 212 in frame 206 appear more photo-realistic than the virtual objects 208, 210, and 212 in frames 202 and 204.

Figure 3:
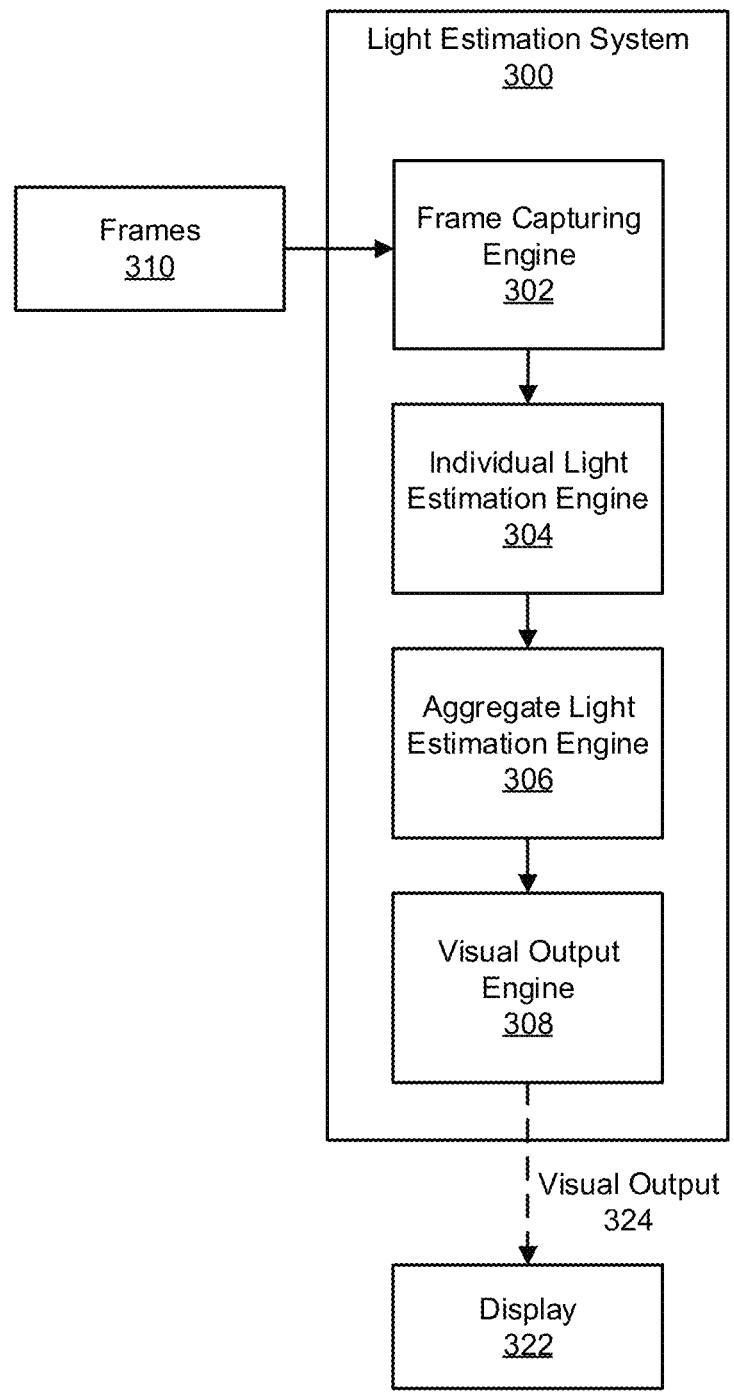
FIG. 3 is a block diagram of an example system for light estimation, in accordance with some examples.

FIG. 3 is a block diagram illustrating an example of a light estimation system 300. In some cases, the light estimation system 300 can include and/or be part of the light estimation system 100 in FIG. 1. For instance, the light estimation system 300 can correspond to all or a portion of the light estimation engine 122. As shown in FIG. 3, the light estimation system 300 can include one or more engines, including a frame capturing engine 302, an individual light estimation engine 304, an aggregate light estimation engine 306, and a visual output engine 308. The engines of the light estimation system 300 can be configured to perform light estimation for one or more frames (e.g., frames 310) received by the frame capturing engine 302. The frames 310 can represent low-dynamic-range (LDR) frames, high-dynamic range (HDR) frames, standard-dynamic-range (SDR) frames, or any suitable type of frames. In some examples, the light estimation system 300 can determine a visual output 324 based at least in part on the light estimation performed for the one or more frames. In one example, the visual output 324 can include virtual content rendered within an XR display (e.g., a display 322). In another example, the visual output 324 can include one or more image processing operations or algorithms applied to image data of one of frames 310.

In some cases, the frame capturing engine 302 can receive frames captured by an image sensor (e.g., image sensor 102) of the light estimation system 300. For example, the frame capturing engine 302 can capture frames 310 while the light estimation system 300 is running an XR application. The individual light estimation engine 304 can perform individual light estimation on all or a portion of the frames 310. As used herein, "individual light estimation" can refer to the process of determining lighting parameters based on image data within an individual (e.g., a single) image frame. Individual light estimation for an individual frame may not include and/or depend on light estimation associated with any other frames.

The individual light estimation engine 304 can perform individual light estimation in various ways. In some cases, the individual light estimation engine 304 can implement one or more machine learning system and/or algorithms configured to perform individual light estimation. For example, the individual light estimation process can be based on a machine learning model trained using a machine learning algorithm on images of scenes associated with various lighting parameters. In this example, the machine learning model can be trained to output lighting parameters associated with a frame when the frame is input to the model during inference. In an illustrative example, the machine learning model can be a deep neural network (NN), such as a convolutional neural network (CNN). Illustrative examples of deep neural networks are described below with respect to FIG. 9 and FIG. 10. In an illustrative example, the deep neural network can be a CNN configured to have an encoder-decoder architecture. Additional examples of the machine learning model include, without limitation, a time delay neural network (TDNN), a deep feed forward neural network (DFFNN), a recurrent neural network (RNN), an auto encoder (AE), a variation AE (VAE), a denoising AE (DAE), a sparse AE (SAE), a markov chain (MC), a perceptron, or some combination thereof. The machine learning algorithm may be a supervised learning algorithm, an unsupervised learning algorithm, a semi-supervised learning algorithm, a generative adversarial network (GAN) based learning algorithm, any combination thereof, or other learning techniques.

Figure 4:
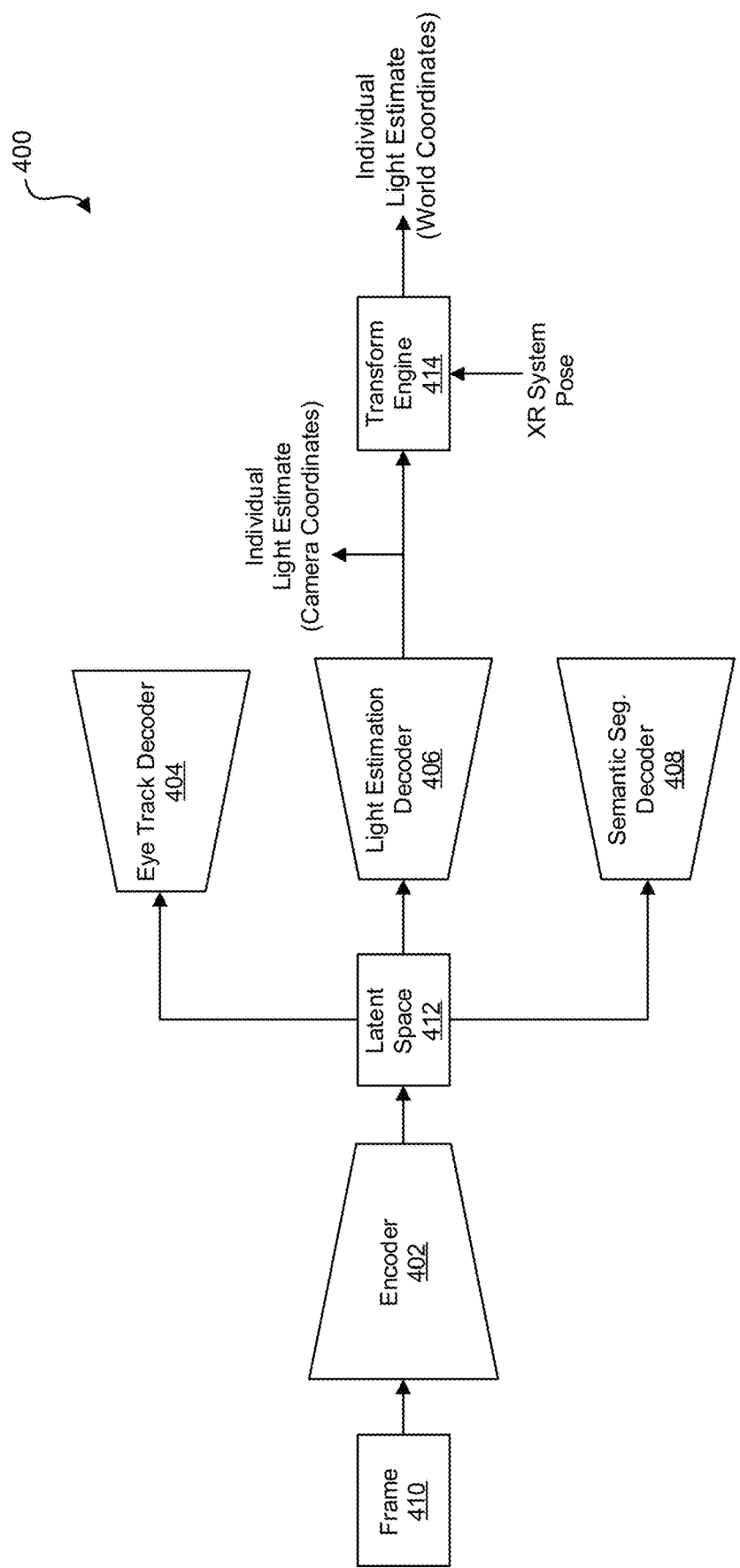
FIG. 4 is a block diagram of an example system for light estimation, in accordance with some examples.

FIG. 4 is a block diagram illustrating an example of an individual light estimation system 400. In some cases, all or a portion of the individual light estimation system 400 can correspond to and/or be implemented by the individual light estimation engine 304 of the light estimation system 300. As shown, the individual light estimation system 400 can include an encoder 402. In some cases, the encoder 402 can represent an encoder of a deep neural network that has an encoder-decoder architecture. In some cases, the encoder 402 can be configured to receive a frame 410 (e.g., corresponding to one of frames 310 in FIG. 3). The encoder 402 can project image data of the frame 410 into a latent space 412 for in order to determine lighting parameters associated with the frame 410. For instance, the encoder 402 can be trained to determine one or more latent feature vectors based on image data projected into the latent space 412. In one example, the encoder 402 can be trained to determine one or more latent feature vectors for each distinct light source associated with a frame. The latent feature vectors can be hidden features that are not directly observed and/or perceived outside of the neural network. In some cases, the encoder 402 can represent a task-specific encoder configured for and/or dedicated to individual light estimation. In other examples, the encoder 402 can represent a common encoder configured to perform various machine learning tasks. For instance, the encoder 402 can be trained to determine a common set of latent feature vectors for multiple tasks such as light estimation, eye tracking, semantic segmentation, and saliency mapping, among others. In this way, the encoder 402 can utilize inference computations performed on the frame 410 for multiple tasks.

In some cases, the individual light estimation system 400 can include a light estimation decoder 406 trained to estimate lighting parameters based on the latent feature vectors determined by the encoder 402. In some cases, the lighting parameters can correspond to and/or be represented by estimated feature vectors. For instance, the light estimation decoder 406 can generate an estimated feature vector corresponding to each distinct light source within the scene. In some cases, the dimension of an estimated feature vector can correspond to the number of lighting parameters represented by the estimated feature vector. In an illustrative example, an estimated feature vector can be four-dimensional, with each dimension representing one of the location, depth, light color, and light intensity associated with a light source. In one example, the light estimation decoder 406 can represent a task-specific decoder configured for and/or dedicated to individual light estimation. As shown in FIG. 4, the individual light estimation system 400 can include one or more additional task-specific decoders, such as an eye track decoder 404 and/or a semantic segmentation decoder 408. However, the individual light estimation system 400 need not include any additional task-specific decoders or general-purpose decoders.

The light estimation decoder 406 can output an individual light estimate associated with the frame 410. As shown, the individual light estimate output by the light estimation decoder 406 can correspond to coordinates of a camera system (e.g., an image sensor) of the individual light estimation system 400. For example, the light estimation decoder 406 can represent the location of a light source with location information (e.g., 3D coordinates, depth values, etc.) relative to the camera system. In some cases, a transform engine 414 of the individual light estimation system 400 can transform the location information (e.g., estimated lighting parameters) output by the light estimation decoder 406 into real-world coordinates. For example, the transform engine 414 can determine 3D locations within the real-world environment corresponding to light sources detected by the light estimation decoder 406. In one example, the transform engine 414 can determine the 3D locations based on a 3D reconstruction of the scene and a current pose (e.g., location, orientation, and/or angle) of the camera system of the individual light estimation system 400. The transform engine 414 can determine the 3D reconstruction and/or the current pose of the camera system using various mapping, tracking, and/or localization techniques (e.g., 6DOF pose-tracking techniques).

Returning to FIG. 3, the aggregate light estimation engine 306 can perform aggregate light estimation using lighting parameters determined from one or more individual light estimations. As used herein, "aggregate light estimation" can refer to the process of determining lighting parameters associated with multiple frames (e.g., at least two frames). The aggregate light estimation engine 306 can perform aggregate light estimation in various ways. In some examples, the aggregate light estimation engine 306 can combine lighting parameters associated with two or more frames. For instance, the aggregate light estimation engine 306 can integrate estimated feature vectors corresponding to the lighting parameters. In some cases, the aggregate light estimation engine 306 can determine an initial aggregate light estimation based on two (or more) frames and update the aggregate light estimation as the light estimation system 300 continues to perform individual light estimation on incoming frames. The aggregate light estimation engine 306 can update the aggregate light estimation after each received frame, or after multiple frames are received. In an illustrative example, the aggregate light estimation engine 306 can update the aggregate light estimation after 4 frames are received.

In some cases, the light estimation system 300 can use aggregate light estimation to determine and/or represent temporal aspects of lighting parameters of a scene. For example, based on a comparison between lighting parameters associated with frames received at different points in time, the aggregate light estimation engine 306 can detect changes in one or more light sources illuminating a scene. In an illustrative example, the aggregate light estimation engine 306 can determine that a light source has been turned on, turned off, dimmed, brightened, or otherwise changed based at least in part on determining that lighting parameters associated with an aggregate light estimation are different (e.g., by at least a threshold amount) than lighting parameters associated with a current frame. The aggregate light estimation engine 306 can update the aggregate light estimation as appropriate based on any detected changes associated with the current frame. As will be explained in more detail below, an aggregate light estimation for a scene can correspond to a temporal average of the lighting parameters of the scene. The aggregate light estimation engine 306 can use the aggregate light estimation to temporally filter lighting parameters.

Based on the aggregate light estimation determined by the aggregate light estimation engine 306, the visual output engine 308 can determine the visual output 324. As mentioned above, the visual output 324 can include virtual content rendered within the display 322. For example, the visual output engine 308 can render one or more visual characteristics of a virtual object based on the aggregate light estimation. In an illustrative example, the visual output engine 308 can render the virtual object using a rendering model that corresponds to and/or has been configured to represent the light sources indicated by the aggregate light estimation. In such an example, the lighting characteristics of the virtual object may be coherent with respect to the lighting characteristics of the real-world environment. The visual output 324 can include any additional or alternative type of visual output. For instance, the visual output 324 can include one or more image processing operations or algorithms applied to image data of one of frames 310. In an illustrative example, the visual output engine 308 can perform an auto-white balance algorithm on at least a portion of the image data of a frame displayed on the display 322. The visual output engine 308 can adjust and/or tailor the auto-white balance algorithm such that one or more lighting characteristics (e.g., color temperature) can be adjusted appropriately in various regions of the frame. In some cases, adjusting lighting characteristics in various regions of the frame can facilitate generating an image that is consistent with how human eyes perceive the real-world environment.

Figure 5A:
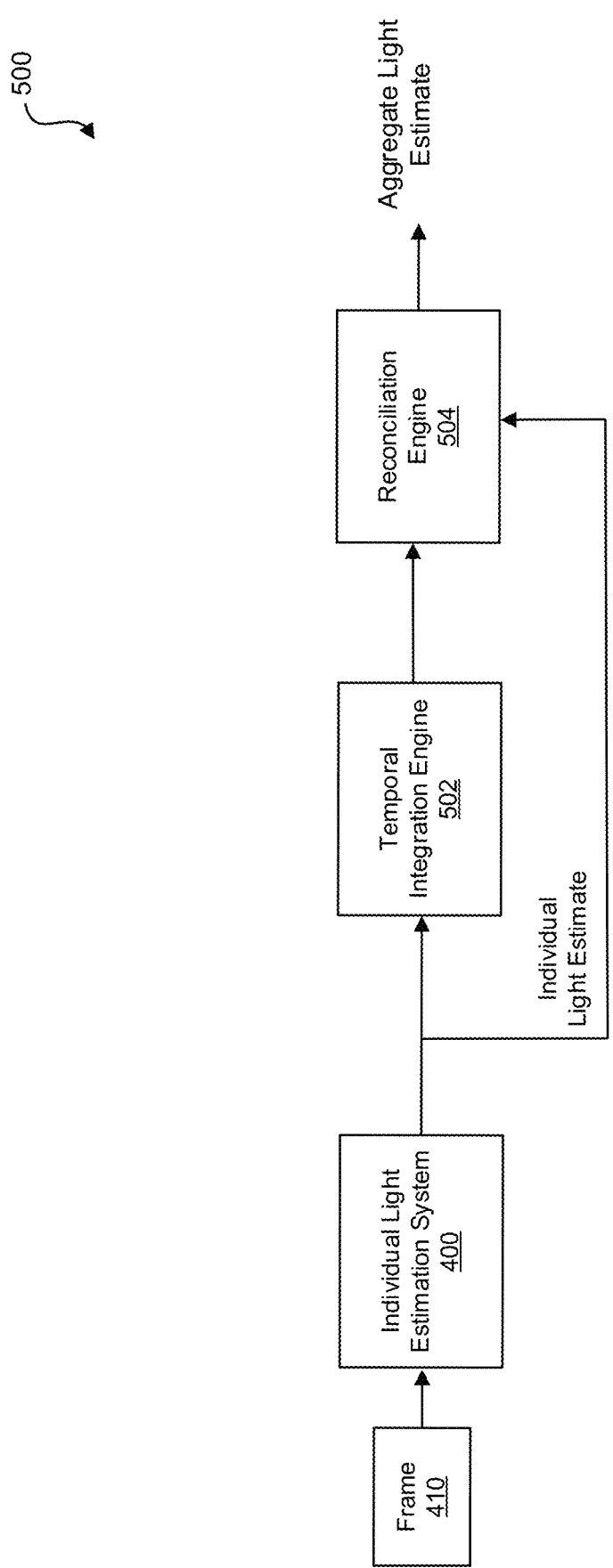
FIG. 5A is block diagram of an example system for light estimation, in accordance with some examples.

FIG. 5A is a block diagram illustrating an example of an aggregate light estimation system 500. The aggregate light estimation system 500 can correspond to an example implementation of the aggregate light estimation engine 306 of the light estimation system 300. In some cases, the aggregate light estimation system 500 can also include and/or implement at least a portion of the individual light estimation system 400. As shown, the aggregate light estimation system 500 can include a temporal integration engine 502. The temporal integration engine 502 can receive the individual light estimate associated with the frame 410 output by the individual light estimation system 400. In some cases, the temporal integration engine 502 can combine lighting parameters associated with the frame 410 and lighting parameters associated with one or more additional frames (e.g., previously received frames). In one example, the temporal integration engine 502 can combine the lighting parameters by integrating estimated feature vectors corresponding to the lighting parameters.

In some cases, the temporal integration engine 502 can implement a clustering-based integration technique. For instance, the temporal integration engine 502 can cluster estimated feature vectors associated with multiple frames. In some cases, a frame can be associated with multiple estimated feature vectors (e.g., if the real-world environment includes multiple light sources, where a frame can be associated with parameters corresponding to the multiple light sources). In one example, each estimated feature vector can represent a position vector within a multi-dimensional clustering map (e.g., a matrix or tensor). A clustering algorithm can determine clusters of estimated features that correspond to (or likely correspond to) particular light sources based on distances between the position vectors. Examples of clustering algorithms that the temporal integration engine 502 can implement include, without limitation, partitioning clustering algorithms, hierarchical clustering algorithms, density-based clustering algorithms, model-based clustering algorithms, k-means clustering algorithms, any combination thereof, and/or any additional clustering algorithm.

Figure 5B:
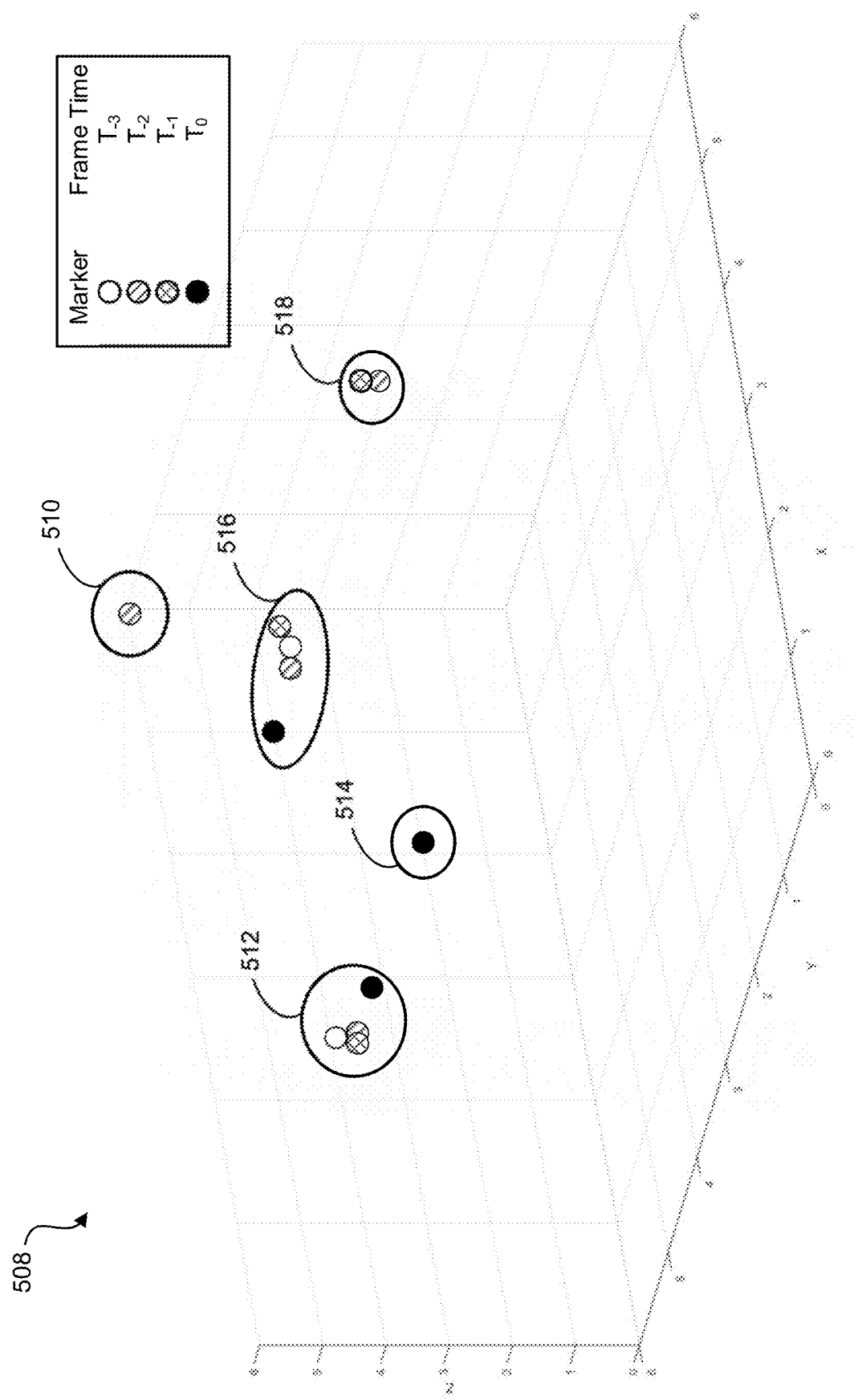
FIG. 5B is an illustration of an example of a cluster map for light estimation, in accordance with some examples.

FIG. 5B is a diagram of an example of a cluster map 508 that illustrates the output of a clustering algorithm performed on estimated feature vectors associated with four frames. The estimated feature vectors for a respective frame are represented in FIG. 5B with markers of the same fill pattern. In an illustrative example, a clustering algorithm implemented by the temporal integration engine 502 can cluster the estimated feature vectors into five clusters (e.g., clusters 510, 512, 514, 516, and 518). Each cluster corresponds to a different light source. For example, a cluster can include multiple estimated feature vectors generated based on individual light estimation for multiple frames. The mean representative of the cluster can represent lighting parameters of an effective light source corresponding to the multiple estimated feature vectors. In some cases, the temporal integration engine 502 can update the cluster map 508 based on new individual light estimates generated by the individual light estimation system 400. For example, in response to receiving estimated feature vectors associated with a current frame, the temporal integration engine 502 can re-run the clustering algorithm on the current estimated feature vectors and the previously received estimated feature vectors. The clustering algorithm can update the cluster map 508 as appropriate. For example, the clustering algorithm can add or remove one or more clusters. In another example, the clustering algorithm can adjust a boundary of one of more clusters to include or remove estimated feature vectors within the one or more clusters.

Returning to FIG. 5A, the reconciliation engine 504 can determine whether to include a light source corresponding to a cluster within an aggregate light estimation of a scene. For example, the reconciliation engine 504 can confirm or reject a light source based on various factors and/or characteristics of the corresponding cluster. In one example, the reconciliation engine 504 can confirm or reject a light source based on a confidence value associated with the corresponding cluster. For instance, a cluster with a high confidence value (e.g., a confidence value above a threshold confidence value) can correspond to a real, accurate, and/or otherwise confirmed light source. The reconciliation engine 504 can include light sources corresponding to clusters with confidence values above a threshold confidence value within an aggregate light estimation of a scene (while excluding light sources corresponding to clusters with confidence values below the threshold confidence value).

In some cases, the clustering algorithm used to determine one or more clusters can determine a confidence value of a cluster. For example, the clustering algorithm can determine a confidence value based at least in part on the number of estimated feature vectors within the cluster and/or the variance of or between the estimated feature vectors. In one example, a cluster with a high number of estimated feature vectors and/or closely spaced estimated feature vectors may have a high confidence value. Referring to FIG. 5B, the reconciliation engine 504 may determine that clusters 512 and 516 have high confidence values (e.g., confidence values above a threshold) based on the clusters including four estimated feature vectors (e.g., an estimated feature vector corresponding to each of the four processed frames). Based on that determination, reconciliation engine 504 can include light sources corresponding to the clusters 512 and 516 within an aggregate light estimation of the scene. In an illustrative example, the reconciliation engine 504 may determine that clusters 510, 514, and/or 518 have low confidence values (e.g., confidence values below the threshold) based on the clusters including a lower number of estimated feature vectors. In such an example, the reconciliation engine 504 can exclude light sources corresponding to the clusters 510, 514, and/or 518 from the aggregate light estimation of the scene.

In some cases, the reconciliation engine 504 can utilize temporal characteristics of one or more clusters to reconcile light estimates corresponding to newer clusters with light estimates corresponding to older clusters. For instance, the reconciliation engine 504 can determine whether a light source corresponding to a new cluster source is more likely to be accurate and/or valid than a light source corresponding to an older cluster. In one example, the reconciliation engine 504 can assign a weight to a cluster based on the point in time at which frames associated with estimated feature vectors within the cluster were received. The point in time can be the absolute point in time and/or a point in time relative to other received frames. In some cases, the reconciliation engine 504 can weight a cluster by adjusting the confidence value of the cluster determined by a clustering algorithm. For example, the reconciliation engine 504 can increase the confidence value to assign a higher weight to the cluster, and decrease the confidence value to assign a lower weight to the cluster.

In some examples, the reconciliation engine 504 can assign a higher weight to clusters associated with older frames. For example, the reconciliation engine 504 can determine that clusters associated with older frames and/or clusters that have remained substantially constant over several frames likely correspond to real and/or accurate light sources. The reconciliation engine 504 can also determine that clusters associated with new frames (e.g., clusters that are not associated with frames older than a certain frame) may correspond to unconfirmed light sources. For example, the reconciliation engine 504 can determine that new clusters may potentially represent "false positives." A false positive can be the result of inherent inaccuracies and/or errors associated with various factors of determining estimated feature vectors, the factors including background signal noise, environmental and/or sensor instabilities, and differing techniques for training neural networks, among other factors. In some cases, the reconciliation engine 504 can assign a low weight to a cluster that is associated with new frames (e.g., the last 2 received frames, the last 3 received frames, etc.). The reconciliation engine 504 can then increase the weight of the cluster based on determining that the cluster remains substantially stable across multiple frames. Referring to FIG. 5B, the reconciliation engine 504 can assign relatively high weights to the clusters 512 and 516 based on the clusters 512 and 516 including estimated feature vectors associated with the oldest frame (e.g., the frame received at time $T_{-3}$). The reconciliation engine 504 can assign lower weights to the clusters 510, 514 and 518 based on those clusters including estimated feature vectors associated with more current frames (and not the oldest frame). In an illustrative example, the reconciliation engine 504 can assign the lowest weight to the cluster 514 based on the cluster 514 including a single estimated feature vector associated with the most current frame.

In other examples, the reconciliation engine 504 can assign higher weights to clusters associated with new frames. For example, the reconciliation engine 504 can assign a high initial weight to a newly detected cluster (e.g., the cluster 514). In this way, the reconciliation engine 504 can quickly incorporate light sources that have been recently turned on into an aggregate light estimation. Further, the reconciliation engine 504 can assign lower weights to clusters associated with old frames (and no new frames). In an illustrative example, the reconciliation engine 504 can lower the weight assigned to the cluster 518 (or remove the cluster 518 from the aggregate light estimate) based on the cluster 518 not including an estimated feature vector associated with the current frame. For instance, the reconciliation engine 504 can determine that the light source corresponding to the cluster 518 has been turned off (e.g., between time $T_{-1}$ and time $T_0$).

In some cases, the temporal integration engine 502 can represent a light source within an aggregate light estimation based on a mean estimate (e.g., average) of the estimated feature vectors within the corresponding cluster. For example, the temporal integration engine 502 can model a particular lighting parameter of a light source by averaging the values of the particular lighting parameter within the estimated feature vectors included in the corresponding cluster. In some cases, this averaging process can increase the accuracy of the modeled lighting parameters. For example, as mentioned above, estimated feature vectors can include one or more errors and/or inaccuracies. Averaging the estimated feature vectors within a cluster can minimize the impact of inaccurate and/or outlying values. Further, averaging the estimated feature vectors can provide a smoother, more immersive XR experience for a user. For instance, determining the value a lighting parameter based on an average of several previous frames may result in a more stable value of the lighting parameter frame-to-frame than a value resulting from using a single frame.

Figure 6A:
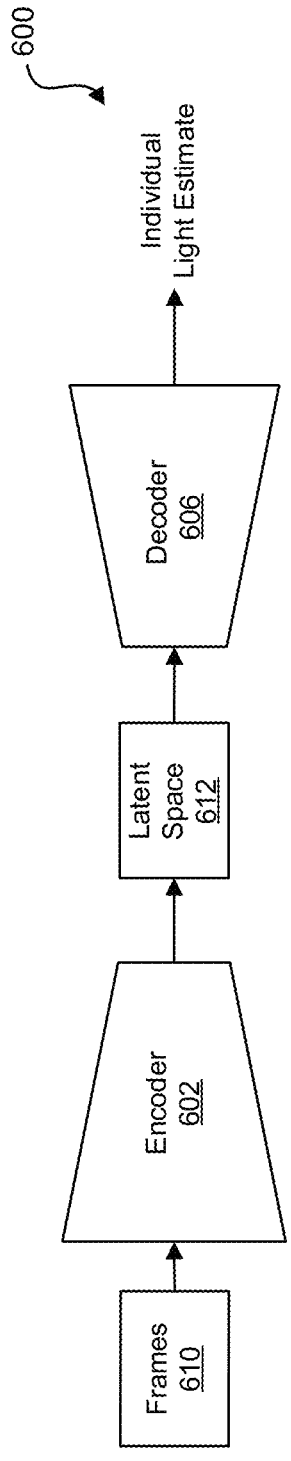
FIG. 6A and FIG. 6B are block diagrams of example systems for training neural networks for light estimation, in accordance with some examples.
Figure 6B:
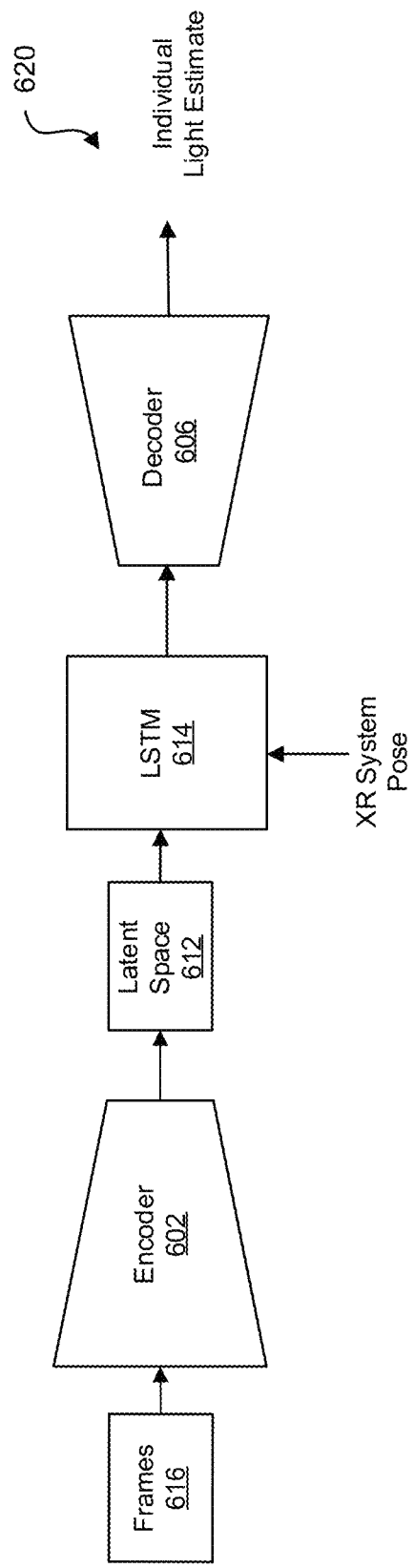

FIG. 6A and FIG. 6B are block diagrams illustrating an example of a light estimation system 600 and a light estimation system 620, respectively. The light estimation systems 600 and 620 can correspond to additional example implementations of the individual light estimation engine 304 and/or the aggregate light estimation engine 306 of the light estimation system 300. In one example, the light estimation systems 600 and 620 can represent example systems for training a deep neural network (e.g., a CNN) to perform individual light estimation and/or aggregate light estimation. In one example, the light estimation system 600 can represent a first training stage of a neural network having an encoder-decoder architecture. The neural network can include an encoder 602 trained to determine latent feature vectors within a latent space 612. In one example, the encoder 602 can be generally similar to the encoder 402 of the light estimation system 400 of FIG. 4. The neural network can also include a decoder 606 trained to generate individual light estimates (e.g., estimated feature vectors) based on the latent feature vectors determined by the encoder 602. In some cases, the encoder 602 and/or the decoder 606 can be trained by inputting into the encoder 602 training data (e.g., frames 610). The training data can include many frames or images that have known lighting parameters (e.g., known positions, colors, power levels, etc.). In some cases, the frames 610 can be configured and/or selected to ensure that the encoder 602 and/or the decoder 606 are exposed to a wide variety of light source configurations.

In one example, the light estimation system 620 can represent a second training stage of the neural network shown in FIG. 6A. In this training stage, the light estimation system 620 can include all or a portion of the components of the light estimation system 600 in addition to a long short-term memory (LSTM) 614. For instance, the LSTM 614 can be added to the neural network of FIG. 6A once the first training stage for the neural network has been completed. In one example, the LSTM 614 can include a neural network with feedback connections, such as an artificial recurrent neural network (RNN). In some cases, the LSTM 614 can be trained to model the relevance of long-term and short-term variations of a scene. For example, the LSTM 614 can be trained to determine connections and/or correlations between changes in a field-of-view (FOV) of the XR system relative to a scene and changes in the lighting parameters of the scene. In some cases, the architecture of the LSTM 614 can be configured to store and/or analyze lighting parameters and/or latent feature vectors associated with previous frames, which may enable the LSTM 614 to distinguish between long-term and short-term light estimates.

In one example, the neural network with the LSTM 614 can be trained by inputting into the encoder 602 training data (e.g., frames 616). In some cases, the frames 616 can be different than the frames 610. For example, the frames 616 can be captured by an XR system (e.g., an HMD or other wearable XR device) while a user of the XR system moves around a real-world environment. In such an example, the frames 616 can represent realistic changes in the FOV of an XR system while the XR system is being used. Further, as shown in FIG. 6B, the LSTM 614 can receive, as input, poses of the XR system. For instance, when processing a frame captured by the XR system, the LSTM 614 can receive the corresponding pose of the XR system. Based on lighting parameters associated with the frame and the corresponding XR system pose, the LSTM 614 can be trained to determine the relevance (e.g., importance) of short-term and long-term changes in lighting parameters. In an illustrative example, the LSTM 614 can be trained to determine how latent feature vectors associated with one or more light sources change based on changes in the pose of the XR system. In some cases, such training can enable the LSTM 614 to distinguish between actual changes in light sources and false positives.

In some cases, the LSTM 614 may not require and/or utilize explicit modeling of various lighting configurations. For example, over the course of training, the LSTM 614 can autonomously learn to prioritize and/or distinguish between short-term light estimates and long-term light estimates. However, in some examples, the LSTM 614 and/or the encoder 602 and the decoder 606 can be manually adjusted and/or fine-turned (e.g., based on explicit models of light estimations). Once the encoder 602, decoder 606, and LSTM 614 shown in FIG. 6A and FIG. 6B have been sufficiently trained, the neural network can output aggregate light estimates based on new frames input during inference.

Figure 7:
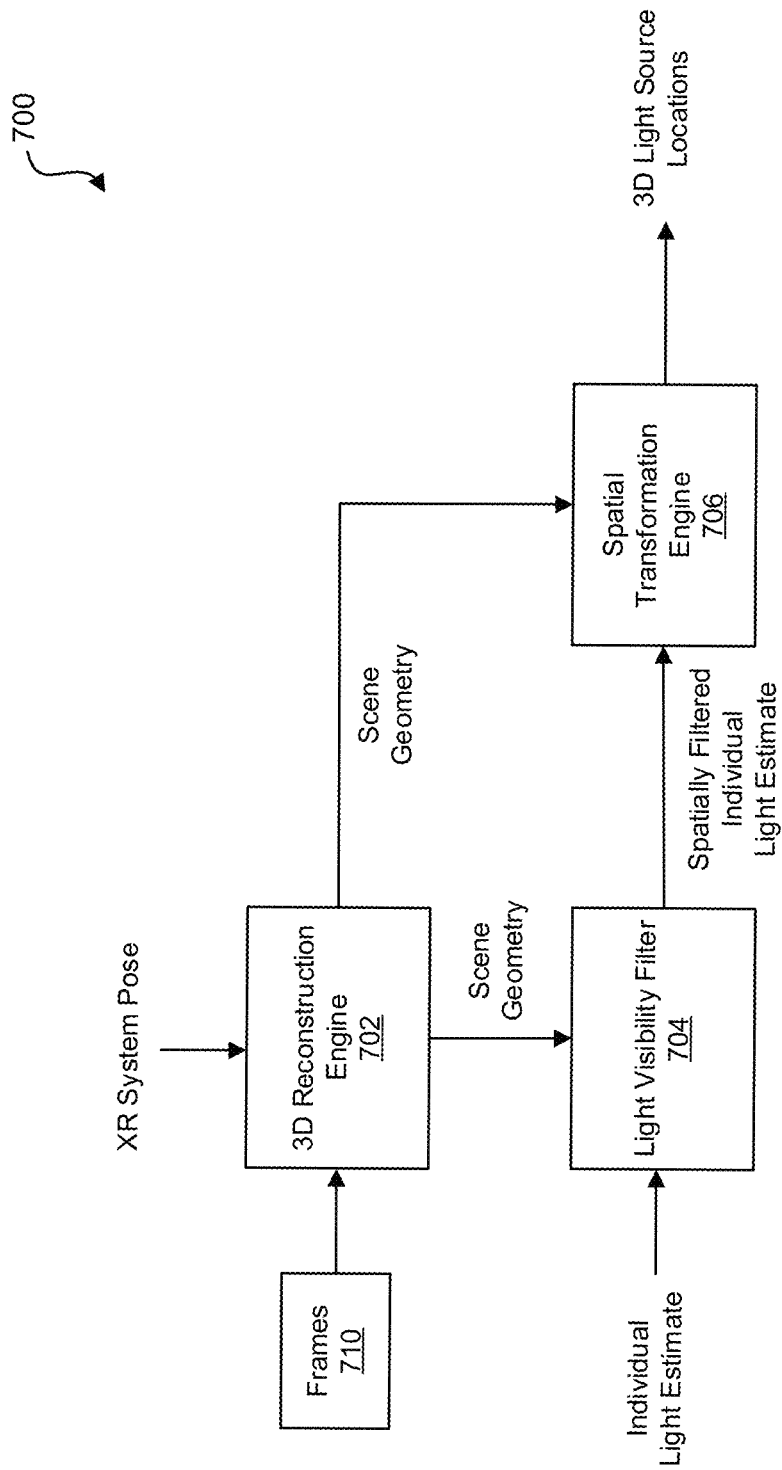
FIG. 7 is block diagram of an example system for light estimation, in accordance with some examples.

FIG. 7 is a block diagram illustrating an example of a light estimation system 700. In some cases, the light estimation system 700 can correspond to an example implementation of all or a portion of the individual light estimation engine 304 of the light estimation system 300. For example, the light estimation system 700 can run in parallel to the individual light estimation engine 304. In some examples, the light estimation system 700 can be configured to spatially filter individual light estimates for use in improving the efficiency and/or quality of aggregate light estimates. For example, based on a 3D reconstruction of a scene, the light estimation system 700 can determine whether obstructions exist (or likely exist) between a light source indicated by an individual light estimate and a camera sensor of the light estimation system 700. The obstructions can include people, pets, pieces of furniture, walls, translucent materials, and/or any other physical object that may prevent light from being transmitted to a camera sensor of the light estimation system 700. In examples where the light estimation system 700 determines that an obstruction exists between the camera sensor and a light source indicated by an individual light estimate, the light estimation system 700 can disregard the light source (e.g., exclude the light source from an aggregate light estimate). Further, in some cases, the light estimation system 700 can utilize a 3D reconstruction of a scene to account for and/or correct inconsistencies and/or errors within individual or aggregate light estimates.

As shown, the light estimation system 700 can include a 3D reconstruction engine 702. The 3D reconstruction engine 702 can determine information about the geometry of a scene (referred to as scene geometry information). The scene geometry information can include depth measurements for objects within the scene, a 3D reconstruction of the scene, among other information. In some cases, the 3D reconstruction engine 702 can determine the scene geometry information based on frames (e.g., frames 710) captured by a camera sensor of an XR device that includes the light estimation system 700. The 3D reconstruction engine 702 can also utilize information about the pose of the XR device corresponding to frames 710 to determine the scene geometry information. In some examples, the 3D reconstruction engine 702 can determine the scene geometry information as a user of the XR device moves about the real-world environment. Further, the 3D reconstruction engine 702 can determine the scene geometry information using one or more SLAM techniques (e.g., a 6DOF SLAM technique) or any other suitable technique.

The light estimation system 700 can also include a light visibility filter 704 that receives an individual light estimate (e.g., generated by the individual light estimation engine 304 and/or the light estimation system 400). In one example, the individual light estimate can determine the location of one or more light sources indicated by the individual light estimate (e.g., with respect to the location of the XR device). The light visibility filter 704 can then determine whether the location of the one or more light sources is consistent with the scene geometry information. For example, the light visibility filter 704 can compare a location of a light source indicated by the individual light estimate with a location of the light source indicated by the scene geometry information. In some cases, if the comparison indicates a discrepancy between the individual light estimate and the scene geometry, the light visibility filter 704 can resolve the discrepancy (e.g., by adjusting lighting parameters of the individual light estimate associated with the location of the light source to match the location indicated by the scene geometry information). Further, in some examples, the light visibility filter can use the scene geometry information to determine whether an obstruction exists (or likely exists) between the light source and the camera sensor. In examples where the light visibility filter 704 determines that an obstruction exists, the light visibility filter can determine that the light source is noise, a false positive, or otherwise invalid. The light visibility filter 704 can then spatially filter the individual light estimate to account for the invalid light source. For instance, the light visibility filter 704 can remove the light source (e.g., remove lighting parameters corresponding to the light source) from the individual light estimate. In some cases, the light visibility filter 704 can pass the spatially filtered individual light estimate to the aggregate light estimation engine 306 of the light estimation system 300 for use in determining an accurate aggregate light estimation of the scene.

As shown in FIG. 7, in some examples, the light visibility filter 704 can pass the spatially filtered individual light estimate to a spatial transformation engine 706. Based on the spatially filtered individual light estimate (and optionally the scene geometry information determined by the 3D reconstruction engine 702), the spatial transformation engine 706 can determine 3D locations of the light sources indicated by the individual light estimate. For example, the spatial transformation engine 706 can transform the locations determined by the light visibility filter 704 (which may be from the perspective of the XR device) to real-world locations. The 3D light source locations determined by the spatial transformation engine 706 can be used for various purposes. In one example, the 3D light source locations can be utilized by one or more lighting models configured to render virtual objects based on real-world locations of light sources. In another example, the 3D light source locations can be utilized to maintain an absolute light map of the scene that is independent of the pose and/or location of the XR device.

The light estimation techniques and systems described herein can include additional or alternative features and/or enhancements. In one example, a light estimation system can store aggregate light estimates in association with a corresponding scene (e.g., a corresponding location and/or environment). For example, the light estimation system can determine space-identification information for a scene. The space-identification information can include GPS coordinates of the scene, one or more images of the scene, user input indicating the location of the scene, among other information. The light estimation system can label the aggregate light estimate with the space-identification information and store the labeled aggregate light estimate (e.g., in a remote or local memory). In some examples, the light estimation system can retrieve the labeled aggregate light estimate at a later point in time. For example, the light estimation system can determine that the device implementing the light estimation system (e.g., an XR device) has returned to the location corresponding to the stored space-identification information. The light estimation system can then retrieve the stored aggregate light estimate, thereby eliminating the need to generate a new aggregate light estimate (e.g., from scratch). In some cases, the light estimation system can use the stored aggregate light estimate as an initial aggregate light estimate and update the initial estimate appropriate based on changes to light sources currently illuminating the scene. In some cases, it can be beneficial to store aggregate light estimates in association with locations and/or environments that have relatively stable and/or consistent light sources (such as indoor locations). Because a stored aggregate light estimate for such a location may be the same as or similar to the current aggregate light estimate, the stored aggregate light estimate can be quickly updated to account for any changes in the light sources.

In some cases, the light estimation techniques and systems described herein can utilize information about the current date and/or time to temporally filter light estimates. For instance, a light estimation system (and/or a 3D reconstruction system) can determine that one or more light sources illuminating a real-world environment correspond to surfaces that transmit sunlight (e.g., windows, sliding glass doors, etc.). The light estimation system can determine that the amount of sunlight transmitted by surfaces varies based on the relative motion of the Earth and Sun throughout the day and/or throughout the year. In an illustrative example, the light estimation system can determine that a room including an East-facing window is illuminated with a greater amount of sunlight in the morning than in the afternoon. In this example, the light estimation system can utilize the determined amount of sunlight to reconcile long-term and short-term light estimates associated with the window. For instance, if the light estimation system detects a new light source at the location of the window at a time of day when the sun is not visible through the window, the light estimation system can determine that the new light source is a false positive (or a different type of light source).

In further examples, the light estimation techniques and systems described herein can detect a light source illuminating a scene based on determining that pixels within one or more frames correspond to the light source. For instance, a light estimation system can utilize one or techniques related to computer vision, image processing, object detection, and/or other techniques to detect image data corresponding to light sources. In an illustrative example, the light estimation system can determine that pixels of an image frame correspond to a lamp that is turned on. In some cases, the light estimation system can use such information to resolve positional ambiguity about a light source. For example, the light estimation system can determine that individual light estimates associated with frames received at different points in time indicate different locations of the light source. The light estimation system can determine a more precise and/or accurate location of the light source based on analyzing image data of the frames.

FIG. 8 is a flow diagram illustrating an example process 800 for light estimation. The steps or operations outlined herein are examples and can be implemented in any combination thereof, including combinations that exclude, add, or modify certain steps or operations.

At operation 802, the process 800 includes receiving a plurality of frames associated with a scene, the plurality of frames including a first frame and a second frame occurring after the first frame. In some cases, the light estimation system 300 can receive the plurality of frames from a camera system of an XR device that implements the light estimation system 300.

At operation 804, the process 800 includes determining, based on image data of the first frame, a first light estimate associated with the scene. In some examples, the light estimation system 300 can determine the first light estimate associated with the scene by determining, based on image data of the first frame, one or more first estimated feature vectors associated with the scene. At operation 806, the process 800 includes determining, based on image data of the second frame, a second light estimate associated with the scene. In some examples, the light estimation system 300 can determine the second light estimate associated with the scene by determining, based on image data of the second frame, one or more second estimated feature vectors associated with the scene. In some examples, the light estimation system can assign a first weight to the one or more first estimated feature vectors and assign a second weight to the one or more second estimated feature vectors. In one example, the second weight can be higher than the first weight. In another example, the second weight can be lower than the first weight. In some cases, the light estimation system 300 can determine the one or more first estimated feature vectors and the one or more second estimated feature vectors using a neural network having an encoder-decoder architecture.

At operation 808, the process 800 includes generating an aggregate light estimate associated with the scene based on combining the second light estimate with at least the first light estimate. In some examples, the light estimation system 300 can generate the aggregate light estimate based on combining the one or more first estimated feature vectors associated with the first light estimate and the one or more second estimated feature vectors associated with the second light estimate. In one example, the light estimation system 300 can combine the one or more first estimated feature vectors and the one or more second estimated feature vectors using a clustering algorithm. In another example, the light estimation system 300 can combine the one or more first estimated feature vectors and the one or more second estimated feature vectors using a neural network. The neural network can include a long short-term memory (LSTM) unit. Further, in some cases, the light estimation system 300 can input, to the neural network, a first pose of the XR device associated with the first frame and a second pose of the XR device associated with the second frame. Using the neural network, the light estimation system 300 can generate the aggregate light estimate based on the first pose and the second pose of the XR device.

In some examples, the process 800 can include detecting a change in at least one light source illuminating the scene based at least in part on comparing the second light estimation and the aggregate light estimation. In some cases, the process 800 can also include determining a third light estimate associated with the scene based on image data of a third frame of the plurality of frames occurring after the second frame. In these cases, the process 800 can include generating an updated aggregate light estimation based on combining the third light estimate with the aggregate light estimation.

In some examples, the process 800 can further include generating a three-dimensional reconstruction of the scene. The three-dimensional reconstruction of the scene can indicate one or more obstructions that prevent light from being transmitted from a light source illuminating the scene to an image sensor of the apparatus. In some cases, the light estimation system 300 can determine a light source indicated by the second light estimate is invalid based at least in part on the one or more obstructions indicated by the three-dimensional reconstruction of the scene. Based on the determination that the light source indicated by the second light estimate is invalid, the light estimation system 300 can exclude the light source indicated by the second light estimate from the aggregate light estimate.

In some cases, the process 800 can further include storing the aggregate light estimate in association with a location of the scene. In these cases, the light estimation system 300 can retrieve the aggregate light estimate based on determining the apparatus is located at the location of the scene.

In some examples, the process 800 can further include determining an amount of sunlight illuminating the scene based at least in part on a current time of day or a current time of year. In these examples, the light estimation system 300 can adjust the aggregate light estimate based at least in part on the amount of sunlight. Further, in some cases, the light estimation system 300 can determine a portion of the second light estimate is invalid based on the amount of sunlight. Based on the determination that the portion of the second light estimate is invalid, the light estimation system 300 can exclude the portion of the light estimation information from the aggregate light estimate.

In some examples, the process 800 can further include determining a location of a light source illuminating the scene based on determining one or more pixels of the plurality of frames correspond to the light source. In some cases, the process 800 can also include rendering virtual content using a display of the XR device based at least in part on the aggregate light estimate. Further, in some examples, the process 800 can include performing one or more image processing operations on the image data of the second frame based at least in part on the aggregate light estimate.

In some examples, the process 800 and/or other processes described herein may be performed by one or more computing devices or apparatuses. In some examples, the process 800 and/or other processes described herein can be performed by the light estimation system 100 shown in FIG. 1, the light estimation system 300 shown in FIG. 3, the individual light estimation system 400 shown in FIG. 4, the aggregate light estimation system 500 shown in FIG. 5A, the light estimation system 600 shown in FIG. 6A, the light estimation system 620 shown in FIG. 6B, the light estimation system 700 shown in FIG. 7, and/or one or more computing devices with the computing device architecture 1100 shown in FIG. 1100. In some cases, such a computing device or apparatus may include a processor, microprocessor, microcomputer, or other component of a device that is configured to carry out the steps of the process 800. In some examples, such computing device or apparatus may include one or more sensors configured to capture image data. For example, the computing device can include a smartphone, a camera, a head-mounted display, a mobile device, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 800 is illustrated as a logical flow diagram, the operations of which represents sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
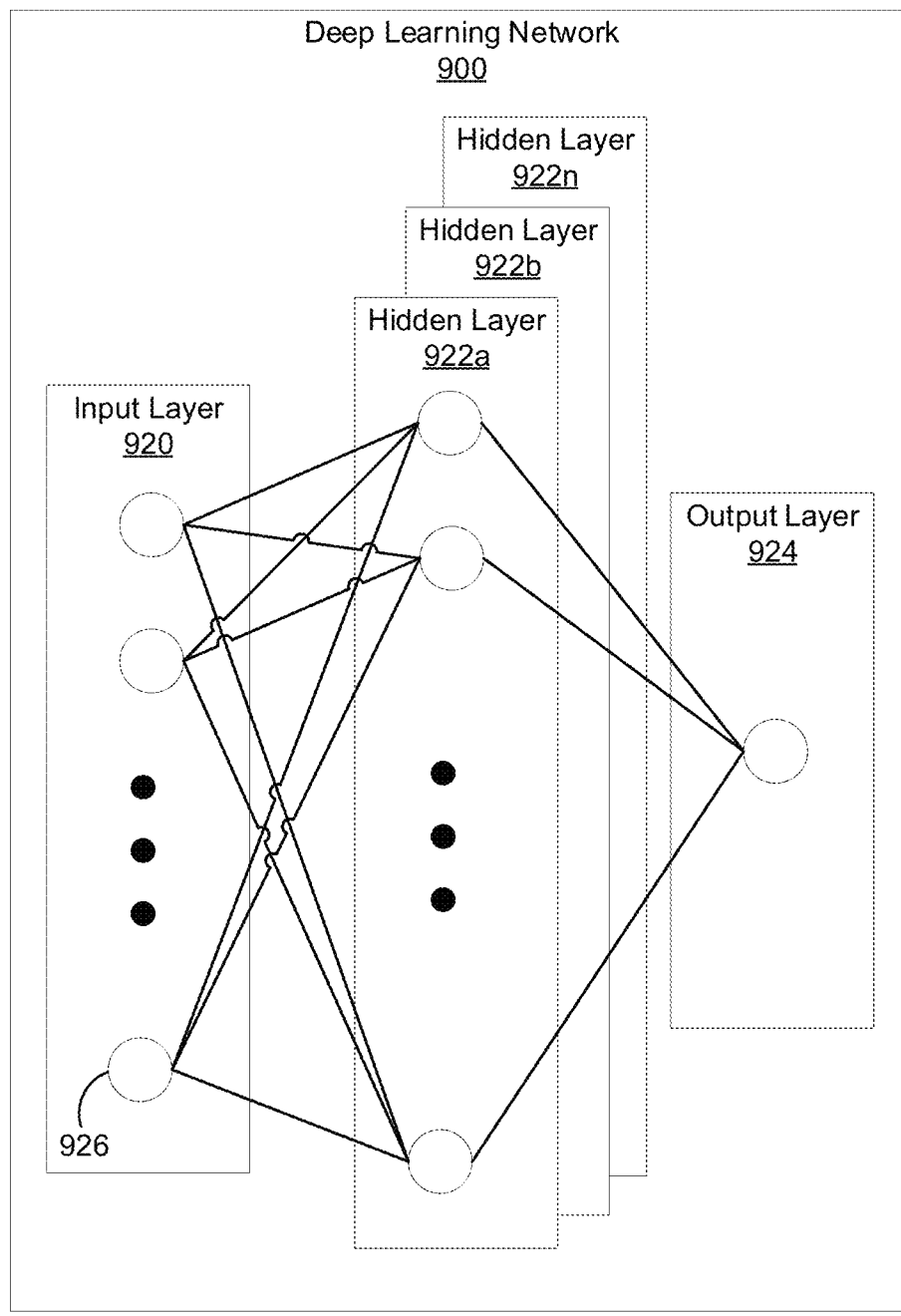
FIG. 9 is a diagram illustrating an example of a deep learning neural network, in accordance with some examples.

FIG. 9 is an illustrative example of a deep learning neural network 900 that can be used by a light estimator. An input layer 920 includes input data. In one illustrative example, the input layer 920 can include data representing the pixels of an input frame. The neural network 900 includes multiple hidden layers 922a, 922b, through 922n. The hidden layers 922a, 922b, through 922n include "n" number of hidden layers, where "n" is an integer greater than or equal to one. The number of hidden layers can be made to include as many layers as needed for the given application. The neural network 900 further includes an output layer 924 that provides an output resulting from the processing performed by the hidden layers 922a, 922b, through 922n. In one illustrative example, the output layer 924 can provide a light estimation associated light a frame. The light estimation can include estimated lighting parameters.

The neural network 900 is a multi-layer neural network of interconnected nodes. Each node can represent a piece of information. Information associated with the nodes is shared among the different layers and each layer retains information as information is processed. In some cases, the neural network 900 can include a feed-forward network, in which case there are no feedback connections where outputs of the network are fed back into itself. In some cases, the neural network 900 can include a recurrent neural network, which can have loops that allow information to be carried across nodes while reading in input.

Information can be exchanged between nodes through node-to-node interconnections between the various layers. Nodes of the input layer 920 can activate a set of nodes in the first hidden layer 922a. For example, as shown, each of the input nodes of the input layer 920 is connected to each of the nodes of the first hidden layer 922a. The nodes of the hidden layers 922a, 922b, through 922n can transform the information of each input node by applying activation functions to these information. The information derived from the transformation can then be passed to and can activate the nodes of the next hidden layer 922b, which can perform their own designated functions. Example functions include convolutional, up-sampling, data transformation, and/or any other suitable functions. The output of the hidden layer 922b can then activate nodes of the next hidden layer, and so on. The output of the last hidden layer 922n can activate one or more nodes of the output layer 924, at which an output is provided. In some cases, while nodes (e.g., node 926) in the neural network 900 are shown as having multiple output lines, a node has a single output and all lines shown as being output from a node represent the same output value.

In some cases, each node or interconnection between nodes can have a weight that is a set of parameters derived from the training of the neural network 900. Once the neural network 900 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 900 to be adaptive to inputs and able to learn as more and more data is processed.

The neural network 900 is pre-trained to process the features from the data in the input layer 920 using the different hidden layers 922a, 922b, through 922n in order to provide the output through the output layer 924. In an example in which the neural network 900 is used to identify objects in images, the neural network 900 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 900 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 900 is trained well enough so that the weights of the layers are accurately tuned.

For the example of identifying objects in images, the forward pass can include passing a training image through the neural network 900. The weights are initially randomized before the neural network 900 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 900, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1).

With the initial weights, the neural network 900 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total}=\Sigma\frac{1}{2}(\text{target}-\text{output})^2$, which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 900 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 900 can include any suitable deep network. One example includes a convolutional neural network (CNN), which includes an input layer and an output layer, with multiple hidden layers between the input and out layers. An example of a CNN is described below with respect to FIG. 9. The hidden layers of a CNN include a series of convolutional, nonlinear, pooling (for downsampling), and fully connected layers. The neural network 900 can include any other deep network other than a CNN, such as an autoencoder, a deep belief nets (DBNs), a Recurrent Neural Networks (RNNs), among others.

Figure 10:
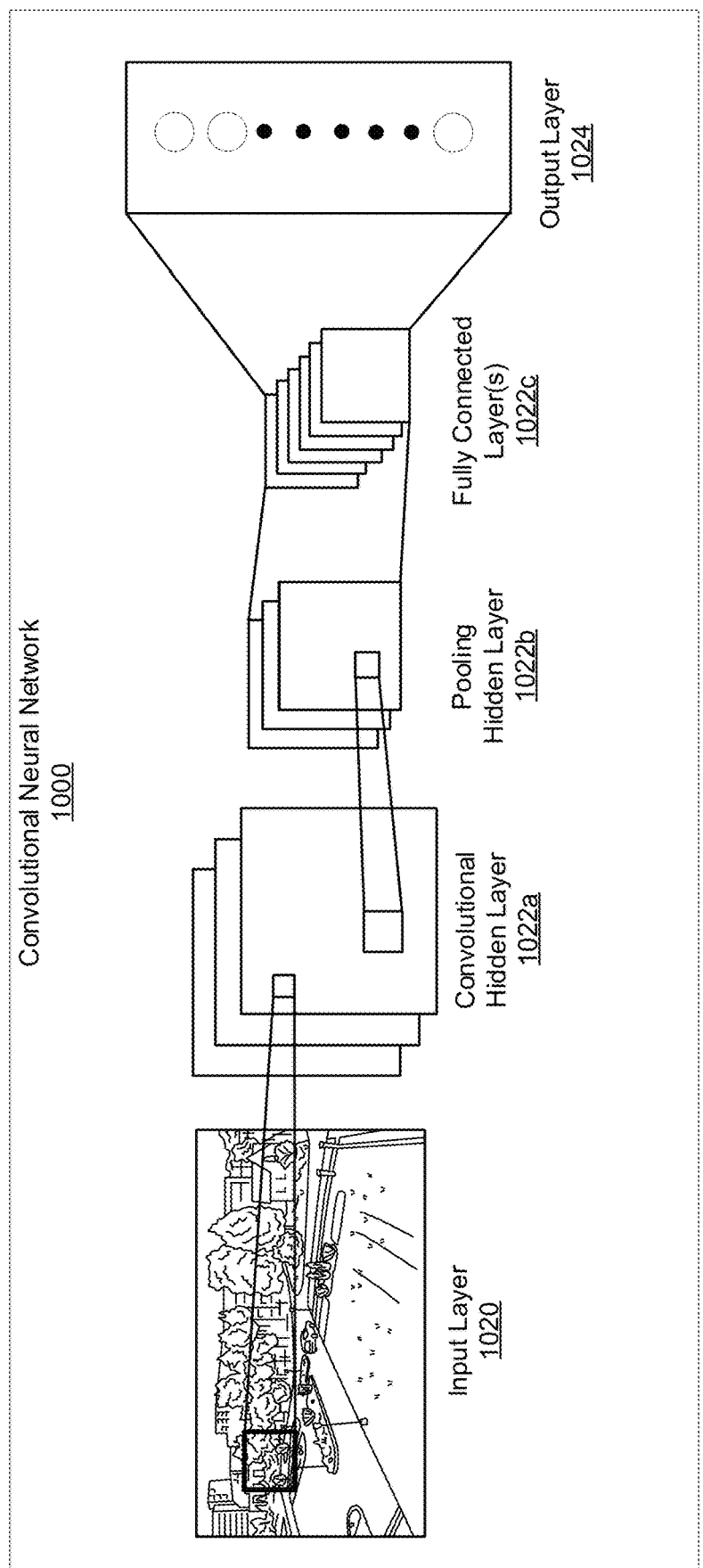
FIG. 10 is a diagram illustrating an example of a convolutional neural network, in accordance with some examples.

FIG. 10 is an illustrative example of a convolutional neural network 1000 (CNN 1000). The input layer 1020 of the CNN 1000 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1022a, an optional non-linear activation layer, a pooling hidden layer 1022b, and fully connected hidden layers 1022c to get an output at the output layer 1024. While only one of each hidden layer is shown in FIG. 10, one of ordinary skill will appreciate that multiple convolutional hidden layers, non-linear layers, pooling hidden layers, and/or fully connected layers can be included in the CNN 1000. As previously described, the output can indicate a single class of an object or can include a probability of classes that best describe the object in the image.

The first layer of the CNN 1000 is the convolutional hidden layer 1022a. The convolutional hidden layer 1022a analyzes the image data of the input layer 1020. Each node of the convolutional hidden layer 1022a is connected to a region of nodes (pixels) of the input image called a receptive field. The convolutional hidden layer 1022a can be considered as one or more filters (each filter corresponding to a different activation or feature map), with each convolutional iteration of a filter being a node or neuron of the convolutional hidden layer 1022a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1022a. Each connection between a node and a receptive field for that node learns a weight and, in some cases, an overall bias such that each node learns to analyze its particular local receptive field in the input image. Each node of the hidden layer 1022a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1022a is due to each node of the convolutional layer being applied to its corresponding receptive field. For example, a filter of the convolutional hidden layer 1022a can begin in the top-left corner of the input image array and can convolve around the input image. As noted above, each convolutional iteration of the filter can be considered a node or neuron of the convolutional hidden layer 1022a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1022a. For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1022a.

The mapping from the input layer to the convolutional hidden layer 1022a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 1022a can include several activation maps in order to identify multiple features in an image. The example shown in FIG. 10 includes three activation maps. Using three activation maps, the convolutional hidden layer 1022a can detect three different kinds of features, with each feature being detectable across the entire image.

In some examples, a non-linear hidden layer can be applied after the convolutional hidden layer 1022a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the network 1000 without affecting the receptive fields of the convolutional hidden layer 1022a.

The pooling hidden layer 1022b can be applied after the convolutional hidden layer 1022a (and after the non-linear hidden layer when used). The pooling hidden layer 1022b is used to simplify the information in the output from the convolutional hidden layer 1022a. For example, the pooling hidden layer 1022b can take each activation map output from the convolutional hidden layer 1022a and generates a condensed activation map (or feature map) using a pooling function. Max-pooling is one example of a function performed by a pooling hidden layer. Other forms of pooling functions be used by the pooling hidden layer 1022a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1022a. In the example shown in FIG. 10, three pooling filters are used for the three activation maps in the convolutional hidden layer 1022a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 1022a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1022a having a dimension of 24×24 nodes, the output from the pooling hidden layer 1022b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1000.

The final layer of connections in the network is a fully-connected layer that connects every node from the pooling hidden layer 1022b to every one of the output nodes in the output layer 1024. Using the example above, the input layer includes 28×28 nodes encoding the pixel intensities of the input image, the convolutional hidden layer 1022a includes 3×24×24 hidden feature nodes based on application of a 5×5 local receptive field (for the filters) to three activation maps, and the pooling layer 1022b includes a layer of 3×12×12 hidden feature nodes based on application of max-pooling filter to 2×2 regions across each of the three feature maps. Extending this example, the output layer 1024 can include ten output nodes. In such an example, every node of the 3×12×12 pooling hidden layer 1022b is connected to every node of the output layer 1024.

The fully connected layer 1022c can obtain the output of the previous pooling layer 1022b (which should represent the activation maps of high-level features) and determines the features that most correlate to a particular class. For example, the fully connected layer 1022c layer can determine the high-level features that most strongly correlate to a particular class, and can include weights (nodes) for the high-level features. A product can be computed between the weights of the fully connected layer 1022c and the pooling hidden layer 1022b to obtain probabilities for the different classes. For example, if the CNN 1000 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1024 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 11:
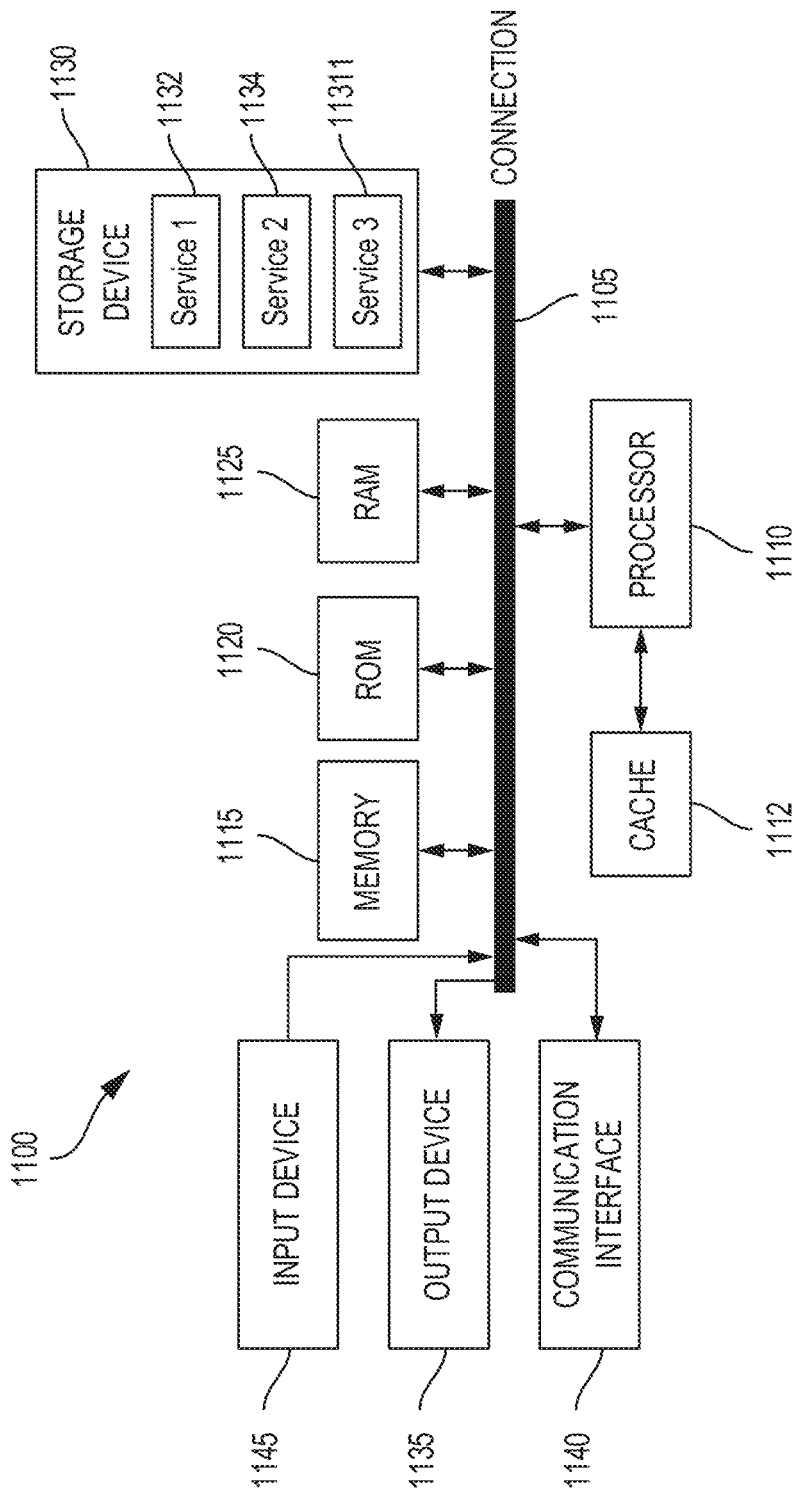
FIG. 11 is a diagram illustrating an example of a system for implementing certain aspects described herein.

FIG. 11 is a diagram illustrating an example of a system for implementing certain aspects of the present technology. In particular, FIG. 11 illustrates an example of computing system 1100, which can be for example any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some examples, computing system 1100 is a distributed system in which the functions described in this disclosure can be distributed within a datacenter, multiple data centers, a peer network, etc. In some examples, one or more of the described system components represents many such components each performing some or all of the function for which the component is described. In some cases, the components can be physical or virtual devices.

Example system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 11311 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some examples, a hardware service that performs a particular function can include the software component stored in a computer-readable medium in connection with the necessary hardware components, such as processor 1110, connection 1105, output device 1135, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the application are provided as follows:

Aspect 1: An apparatus for light estimation comprising a memory and one or more processors coupled to the memory. The one or more processors are configured to: receive a plurality of frames associated with a scene, the plurality of frames including a first frame and a second frame occurring after the first frame; determine, based on image data of the first frame, a first light estimate associated with the scene; determine, based on image data of the second frame, a second light estimate associated with the scene; and generate an aggregate light estimate associated with the scene based on combining the second light estimate with at least the first light estimate.

Aspect 2: The apparatus of aspect 1, wherein the one or more processors are configured to detect a change in at least one light source illuminating the scene based at least in part on comparing the second light estimate and the aggregate light estimate.

Aspect 3: The apparatus of any one of aspects 1 or 2, wherein the one or more processors are configured to: determine a third light estimate associated with the scene based on image data of a third frame of the plurality of frames occurring after the second frame; and generate an updated aggregate light estimate based on combining the third light estimate with the aggregate light estimate.

Aspect 4: The apparatus of any one of aspects 1 to 3, wherein the one or more processors are configured to generate the aggregate light estimate based on combining one or more first estimated feature vectors associated with the first light estimate and one or more second estimated feature vectors associated with the second light estimate.

Aspect 5: The apparatus of aspect 4, wherein the one or more processors are configured to assign a first weight to the one or more first estimated feature vectors and assign a second weight to the one or more second estimated feature vectors, the second weight being higher than the first weight.

Aspect 6: The apparatus of aspect 4, wherein the one or more processors are configured to assign a first weight to the one or more first estimated feature vectors and assign a second weight to the one or more second estimated feature vectors, the second weight being lower than the first weight.

Aspect 7: The apparatus of any one of aspects 4 to 6, wherein the one or more processors are configured to determine the one or more first estimated feature vectors and the one or more second estimated feature vectors using a neural network having an encoder-decoder architecture.

Aspect 8: The apparatus of any one of aspects 4 to 7, wherein the one or more processors are configured to combine the one or more first estimated feature vectors and the one or more second estimated feature vectors using a clustering algorithm.

Aspect 9: The apparatus of any one of aspects 4 to 7, wherein the one or more processors are configured to combine the one or more first estimated feature vectors and the one or more second estimated feature vectors using a neural network.

Aspect 10: The apparatus of aspect 9, wherein the one or more processors are configured to: input, to the neural network, a first pose of the apparatus associated with the first frame and a second pose of the apparatus associated with the second frame; and generate, using the neural network, the aggregate light estimate based on the first pose and the second pose of the apparatus.

Aspect 11: The apparatus of any one of aspects 9 to 10, wherein the neural network includes a long short-term memory (LSTM) unit.

Aspect 12: The apparatus of any one of aspects 1 to 11, wherein the one or more processors are configured to generate a three-dimensional reconstruction of the scene, the three-dimensional reconstruction of the scene indicating one or more obstructions that prevent light from being transmitted from a light source illuminating the scene to an image sensor of the apparatus.

Aspect 13: The apparatus of aspect 12, wherein the one or more processors are configured to: determine a light source indicated by the second light estimate is invalid based at least in part on the one or more obstructions indicated by the three-dimensional reconstruction of the scene; and based on the determination that the light source indicated by the second light estimate is invalid, exclude the light source indicated by the second light estimate from the aggregate light estimate.

Aspect 14: The apparatus of any one of aspects 1 to 13, wherein the one or more processors are configured to: store the aggregate light estimate in association with a location of the scene; and retrieve the aggregate light estimate based on determining the apparatus is located at the location of the scene.

Aspect 15: The apparatus of any one of aspects 1 to 14, wherein the one or more processors are configured to: determine an amount of sunlight illuminating the scene based at least in part on a current time of day or a current time of year; and adjust the aggregate light estimate based at least in part on the amount of sunlight.

Aspect 16: The apparatus of aspect 15, wherein the one or more processors are configured to: determine a portion of the second light estimate is invalid based on the amount of sunlight; and based on the determination that the portion of the second light estimate is invalid, exclude the portion of the second light estimate from the aggregate light estimate.

Aspect 17: The apparatus of any one of aspects 1 to 16, wherein the one or more processors are configured to determine a location of a light source illuminating the scene based on determining one or more pixels of the plurality of frames correspond to the light source.

Aspect 18: The apparatus of any one of aspects 1 to 17, wherein the one or more processors are configured to render virtual content using a display of the apparatus based at least in part on the aggregate light estimate.

Aspect 19: The apparatus of any one of aspects 1 to 18, wherein the one or more processors are configured to perform one or more image processing operations on the image data of the second frame based at least in part on the aggregate light estimate.

Aspect 20: The apparatus of any one of aspects 1 to 19, wherein the apparatus includes an extended reality system.

Aspect 21: The apparatus of any one of aspects 1 to 20, wherein the apparatus includes a mobile device.

Aspect 22: The apparatus of any one of aspects 1 to 21, further comprising a display.

Aspect 23: A method for light estimation, the method comprising: receiving a plurality of frames associated with a scene, the plurality of frames including a first frame and a second frame occurring after the first frame; determining, based on image data of the first frame, a first light estimate associated with the scene; determining, based on image data of the second frame, a second light estimate associated with the scene; and generating an aggregate light estimate associated with the scene based on combining the second light estimate with at least the first light estimate.

Aspect 24: The method of aspect 23, further comprising detecting a change in at least one light source illuminating the scene based at least in part on comparing the second light estimate and the aggregate light estimate.

Aspect 25: The method of any one of aspects 23 or 24, further comprising: determining a third light estimate associated with the scene based on image data of a third frame of the plurality of frames occurring after the second frame; and generating an updated aggregate light estimate based on combining the third light estimate with the aggregate light estimate.

Aspect 26: The method of any one of aspects 23 to 25, wherein the aggregate light estimate is generated based on combining one or more first estimated feature vectors associated with the first light estimate and one or more second estimated feature vectors associated with the second light estimate.

Aspect 27: The method of aspect 26, further comprising assigning a first weight to the one or more first estimated feature vectors and assign a second weight to the one or more second estimated feature vectors, the second weight being higher than the first weight.

Aspect 28: The method of aspect 26, further comprising assigning a first weight to the one or more first estimated feature vectors and assign a second weight to the one or more second estimated feature vectors, the second weight being lower than the first weight.

Aspect 29: The method of any one of aspects 4 to 28, wherein the one or more first estimated feature vectors and the one or more second estimated feature vectors are determined using a neural network having an encoder-decoder architecture.

Aspect 30: The method of any one of aspects 4 to 29, further comprising combining the one or more first estimated feature vectors and the one or more second estimated feature vectors using a clustering algorithm.

Aspect 31: The method of any one of aspects 4 to 29, further comprising combining the one or more first estimated feature vectors and the one or more second estimated feature vectors using a neural network.

Aspect 32: The method of aspect 31, further comprising: inputting, to the neural network, a first pose of a device associated with the first frame and a second pose of the device associated with the second frame; and generating, using the neural network, the aggregate light estimate based on the first pose and the second pose of the device.

Aspect 33: The method of any one of aspects 31 to 32, wherein the neural network includes a long short-term memory (LSTM) unit.

Aspect 34: The method of any one of aspects 23 to 33, further comprising generating a three-dimensional reconstruction of the scene, the three-dimensional reconstruction of the scene indicating one or more obstructions that prevent light from being transmitted from a light source illuminating the scene to an image sensor of a device.

Aspect 35: The method of aspect 34, further comprising: determining a light source indicated by the second light estimate is invalid based at least in part on the one or more obstructions indicated by the three-dimensional reconstruction of the scene; and based on the determination that the light source indicated by the second light estimate is invalid, excluding the light source indicated by the second light estimate from the aggregate light estimate.

Aspect 36: The method of any one of aspects 23 to 35, further comprising: storing the aggregate light estimate in association with a location of the scene; and retrieving the aggregate light estimate based on determining a device is located at the location of the scene.

Aspect 37: The method of any one of aspects 23 to 36, further comprising: determining an amount of sunlight illuminating the scene based at least in part on a current time of day or a current time of year; and adjusting the aggregate light estimate based at least in part on the amount of sunlight.

Aspect 38: The method of aspect 37, further comprising: determining a portion of the second light estimate is invalid based on the amount of sunlight; and based on the determination that the portion of the second light estimate is invalid, excluding the portion of the second light estimate from the aggregate light estimate.

Aspect 39: The method of any one of aspects 23 to 38, wherein the one or more processors are configured to determine a location of a light source illuminating the scene based on determining one or more pixels of the plurality of frames correspond to the light source.

Aspect 40: The method of any one of aspects 23 to 39, further comprising rendering virtual content using a display based at least in part on the aggregate light estimate.

Aspect 41: The method of any one of aspects 23 to 40, further comprising performing one or more image processing operations on the image data of the second frame based at least in part on the aggregate light estimate.

Aspect 42: A non-transitory computer-readable storage medium for light estimation, the non-transitory computer-readable storage medium instructions stored therein which, when executed by one or more processors, cause the one or more processors to perform any of the operations of aspects 1 to 41.

Aspect 43: An apparatus comprising means for performing any of the operations of aspects 1 to 41.

What is claimed is:

1. An apparatus for light estimation, the apparatus comprising:
   a memory; and
   one or more processors coupled to the memory, the one or more processors being configured to:
      receive a plurality of frames associated with a scene, the plurality of frames including a first frame and a second frame occurring after the first frame;
      determine, based on image data of the first frame, a first light estimate associated with the scene, the first light estimate including at least one of a first estimated intensity or a first estimated color temperature of light emitted by at least one light source illuminating the scene;
      determine, based on image data of the second frame, a second light estimate associated with the scene, the second light estimate including at least one of a second estimated intensity or a second estimated color temperature of the light emitted by the at least one light source;
      assign a first weight to one or more first estimated feature vectors associated with the first light estimate to generate one or more first weighted feature vectors and a second weight to one or more second estimated feature vectors associated with the second light estimate to generate one or more second weighted feature vectors; and
      generate an aggregate light estimate for modeling temporal lighting parameters associated with the scene based on the one or more first weighted feature vectors and the one or more second weighted feature vectors, the one or more first estimated feature vectors and the one or more second estimated feature vectors being generated using a neural network having an encoder-decoder architecture.

2. The apparatus of claim 1, wherein the one or more processors are configured to detect a change in the at least one light source based at least in part on comparing the second light estimate and the aggregate light estimate.

3. The apparatus of claim 1, wherein the one or more processors are configured to:
   determine a third light estimate associated with the scene based on image data of a third frame of the plurality of frames occurring after the second frame; and
   generate an updated aggregate light estimate based on combining the third light estimate with the aggregate light estimate.

4. The apparatus of claim 1, wherein the second weight is higher than the first weight.

5. The apparatus of claim 1, wherein the second weight is lower than the first weight.

6. The apparatus of claim 1, wherein the one or more processors are configured to generate the aggregate light estimate using a clustering algorithm.

7. The apparatus of claim 1, wherein the one or more processors are configured to combine the one or more first weighted feature vectors and the one or more second weighted feature vectors using the neural network.

8. The apparatus of claim 1, wherein the one or more processors are configured to:
   input, to the neural network, a first pose of the apparatus associated with the first frame and a second pose of the apparatus associated with the second frame; and
   generate, using the neural network, the aggregate light estimate based on the first pose and the second pose of the apparatus.

9. The apparatus of claim 1, wherein the neural network includes a long short-term memory (LSTM) unit.

10. The apparatus of claim 1, wherein the one or more processors are configured to generate a three-dimensional reconstruction of the scene, the three-dimensional reconstruction of the scene indicating one or more obstructions that prevent light from being transmitted from the at least one light source illuminating the scene to an image sensor of the apparatus.

11. The apparatus of claim 10, wherein the one or more processors are configured to:
   determine a light source indicated by the second light estimate is invalid based at least in part on the one or more obstructions indicated by the three-dimensional reconstruction of the scene; and
   based on the determination that the light source indicated by the second light estimate is invalid, exclude the light source indicated by the second light estimate from the aggregate light estimate.

12. The apparatus of claim 1, wherein the one or more processors are configured to:
   store the aggregate light estimate in association with a location of the scene; and
   retrieve the aggregate light estimate based on determining the apparatus is located at the location of the scene.

13. The apparatus of claim 1, wherein the one or more processors are configured to:
   determine an amount of sunlight illuminating the scene based at least in part on a current time of day or a current time of year; and
   adjust the aggregate light estimate based at least in part on the amount of sunlight.

14. The apparatus of claim 13, wherein the one or more processors are configured to:
   determine a portion of the second light estimate is invalid based on the amount of sunlight; and
   based on the determination that the portion of the second light estimate is invalid, exclude the portion of the second light estimate from the aggregate light estimate.

15. The apparatus of claim 1, wherein the one or more processors are configured to determine a location of a light source illuminating the scene based on determining one or more pixels of the plurality of frames correspond to the light source.

16. The apparatus of claim 1, wherein the one or more processors are configured to render virtual content using a display of the apparatus based at least in part on the aggregate light estimate.

17. The apparatus of claim 1, wherein the one or more processors are configured to perform one or more image processing operations on the image data of the second frame based at least in part on the aggregate light estimate.

18. The apparatus of claim 1, wherein the apparatus includes an extended reality system.

19. The apparatus of claim 1, wherein the apparatus includes a mobile device.

20. The apparatus of claim 1, further comprising a display.

21. A method for light estimation, the method comprising:
receiving a plurality of frames associated with a scene, the plurality of frames including a first frame and a second frame occurring after the first frame;
determining, based on image data of the first frame, a first light estimate associated with the scene, the first light estimate including at least one of a first estimated intensity or a first estimated color temperature of light emitted by at least one light source illuminating the scene;
determining, based on image data of the second frame, a second light estimate associated with the scene, the second light estimate including at least one of a second estimated intensity or a second estimated color temperature of the light emitted by the at least one light source;
assigning a first weight to one or more first estimated feature vectors associated with the first light estimate to generate one or more first weighted feature vectors and a second weight to one or more second estimated feature vectors associated with the second light estimate to generate one or more second weighted feature vectors; and
generating an aggregate light estimate for modeling temporal lighting parameters associated with the scene based on the one or more first weighted feature vectors and the one or more second weighted feature vectors, the one or more first estimated feature vectors and the one or more second estimated feature vectors being generated using a neural network having an encoder-decoder architecture.

22. The method of claim 21, further comprising detecting a change in the at least one light source based at least in part on comparing the second light estimate and the aggregate light estimate.

23. The method of claim 21, wherein generating the aggregate light estimate includes using a clustering algorithm.

24. The method of claim 21, wherein combining the one or more first estimated feature vectors and the one or more second estimated feature vectors includes using a neural network.

25. The method of claim 21, further comprising generating a three-dimensional reconstruction of the scene, the three-dimensional reconstruction of the scene indicating one or more obstructions that prevent light from being transmitted from the at least one light source illuminating the scene to an image sensor that captures the plurality of frames.

26. A non-transitory computer-readable storage medium for light estimation, the non-transitory computer-readable storage medium comprising instructions stored therein which, when executed by one or more processors, cause the one or more processors to:
receive a plurality of frames associated with a scene, the plurality of frames including a first frame and a second frame occurring after the first frame;
determine, based on image data of the first frame, a first light estimate associated with the scene, the first light estimate including at least one of a first estimated intensity or a first estimated color temperature of light emitted by at least one light source illuminating the scene;
determine, based on image data of the second frame, a second light estimate associated with the scene, the second light estimate including at least one of a second estimated intensity or a second estimated color temperature of the light emitted by the at least one light source;
assign a first weight to one or more first estimated feature vectors associated with the first light estimate to generate one or more first weighted feature vectors and a second weight to one or more second estimated feature vectors associated with the second light estimate to generate one or more second weighted feature vectors; and
generate an aggregate light estimate for modeling temporal lighting parameters associated with the scene based on the one or more first weighted feature vectors and the one or more second weighted feature vectors, the one or more first estimated feature vectors and the one or more second estimated feature vectors being generated using a neural network having an encoder-decoder architecture.

27. The method of claim 21, further comprising:
determining a third light estimate associated with the scene based on image data of a third frame of the plurality of frames occurring after the second frame; and
generating an updated aggregate light estimate based on combining the third light estimate with the aggregate light estimate.

28. The method of claim 21, wherein the second weight is higher than the first weight.

29. The method of claim 21, wherein the second weight is lower than the first weight.

30. The method of claim 21, further comprising:
inputting, to the neural network, a first pose of a device associated with the first frame and a second pose of the device associated with the second frame; and
generating, using the neural network, the aggregate light estimate based on the first pose and the second pose of the device.

* * * * *